US010743264B2

(12) United States Patent
Raghavan et al.

(10) Patent No.: US 10,743,264 B2
(45) Date of Patent: Aug. 11, 2020

(54) INDICATING ENERGY AND THERMAL CONSTRAINTS IN A WIRELESS COMMUNICATIONS SYSTEM

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Wooseok Nam, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/276,376

(22) Filed: Feb. 14, 2019

(65) Prior Publication Data
US 2019/0342843 A1 Nov. 7, 2019

Related U.S. Application Data

(60) Provisional application No. 62/665,707, filed on May 2, 2018.

(51) Int. Cl.
*H04W 52/36* (2009.01)
*G06F 1/20* (2006.01)
(Continued)

(52) U.S. Cl.
CPC .......... *H04W 52/365* (2013.01); *G06F 1/206* (2013.01); *H04B 7/0486* (2013.01); *H04B 7/063* (2013.01);
(Continued)

(58) Field of Classification Search
CPC . H04W 52/365; H04W 72/04; H04W 72/046; H04W 72/042; H04W 72/0453;
(Continued)

(56) References Cited

U.S. PATENT DOCUMENTS 7,158,489 B1 1/2007 Knuutila et al.
2012/0275366 A1* 11/2012 Anderson ......... H04W 52/0219
370/311
(Continued)

FOREIGN PATENT DOCUMENTS

WO      WO-0001094 A1     1/2000
WO      WO-2017003266 A1   1/2017

OTHER PUBLICATIONS

International Search Report and Written Opinion—PCT/US2019/025672—ISA/EPO—dated Jun. 14, 2019.

*Primary Examiner* — Philip Sobutka
(74) *Attorney, Agent, or Firm* — Linda G. Gunderson

(57) ABSTRACT

Methods, systems, and devices for wireless communications are described. A user equipment (UE) may identify an indication of an amount of remaining energy for the UE. In some cases, the UE may identify an indication of a temperature of the UE. In some cases, the UE may determine a constraint indicator based on the amount of remaining energy for the UE or the temperature of the UE. The UE may then transmit the constraint indicator to a base station via physical layer signaling. According to another embodiment, the UE may determine an alternative transmission mode based on the amount of remaining energy for the UE or the temperature of the UE. The UE may then transmit an indicator of the alternative transmission mode to the base station via physical layer signaling.

30 Claims, 18 Drawing Sheets

(51) Int. Cl.
*H04W 72/04* (2009.01)
*H04B 7/06* (2006.01)
*H04L 27/26* (2006.01)
*H04B 7/0456* (2017.01)
*H04L 1/00* (2006.01)
*H04L 5/00* (2006.01)

(52) U.S. Cl.
CPC ......... *H04B 7/0632* (2013.01); *H04L 1/0003* (2013.01); *H04L 1/0009* (2013.01); *H04L 5/0098* (2013.01); *H04L 27/2676* (2013.01); *H04W 72/046* (2013.01)

(58) Field of Classification Search
CPC ... H04W 72/048; H04B 7/0486; H04B 7/063; H04B 7/0632; H04B 17/00; H04L 1/0003; H04L 1/0009; H04L 27/2676; H04L 5/0098; G06F 1/206
USPC ........ 455/450, 452.1, 452.2, 67.11, 572, 574
See application file for complete search history.

(56) References Cited

U.S. PATENT DOCUMENTS

| 2014/0269552 A1* | 9/2014 | Saito | H04L 5/0058 370/329 |
| 2018/0199290 A1* | 7/2018 | Bang | H04W 24/02 |

\* cited by examiner

INDICATING ENERGY AND THERMAL CONSTRAINTS IN A WIRELESS COMMUNICATIONS SYSTEM

CROSS REFERENCES

The present application for patent claims benefit of U.S. Provisional Patent Application No. 62/665,707 by Raghavan et al., entitled "INDICATING ENERGY AND THERMAL CONSTRAINTS IN A WIRELESS COMMUNICATIONS SYSTEM," filed May 2, 2018, assigned to the assignee hereof, and expressly incorporated by reference in its entirety.

BACKGROUND

The following relates generally to wireless communications, and more specifically indicating energy and thermal constraints in a wireless communications system.

Wireless communications systems are widely deployed to provide various types of communications content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

In some wireless communications systems, such as millimeter wave (mmW) or other systems that use beamforming, a base station may communicate with a UE using multiple antennas. In a mmW system, UEs may be configured to use a large number of antennas and operate at a high frequency. This may result in one or more of high energy consumption or high heat generation at the UE. Current techniques for performing wireless communications in mmW systems, in certain instances, may thus be deficient.

SUMMARY

The described techniques relate to improved methods, systems, devices, or apparatuses that support indicating energy and thermal constraints in a wireless communications system. In some wireless communications systems (e.g., fifth generation (5G) or millimeter wave (mmW) communications systems), base stations and user equipments (UEs) are configured with multiple antennas, which may be used for directional or beamformed transmissions. In some cases, the UEs may be configured with a number of antenna sub-arrays, and each sub-array may be connected with multiple radio frequency (RF) chains (e.g., chains of RF circuitry related to operating the sub-array). The use of an increased number of antennas and an increased amount of associated RF circuitry may contribute to increased energy consumption and increased temperatures increase. In some cases, thermal overload or high energy consumption at the UE may lead the UE to shut down which in turn may lead to a loss in service. As another example, thermal overload may make the UE uncomfortable for a user (e.g., may make the UE undesirably hot for a human user). Thus there exists a need for a UE to transmit messages indicating energy and/or thermal constraints, and for a base station to coordinate with the UE in view of such constraints.

In some examples, a UE may determine an amount of remaining energy for the UE (e.g., according to an identified indication of the amount of remaining energy for the UE). The UE may alternatively or additionally determine a temperature of the UE (e.g., according to an identified indication of the temperature of the UE). The UE may determine a constraint indicator based on the amount of remaining energy for the UE and/or the temperature of the UE. The constraint indicator may thus function as an energy indicator and/or a temperature indicator. In some examples, the UE may select a discrete value for the constraint indicator. In some cases, the UE may select the discrete value from a set of discrete values. The UE may transmit the constraint indicator to a base station via physical layer signaling. In some cases, the UE may transmit the constraint indicator to the base station via physical layer signaling. In some cases, the physical layer transmission may include a channel quality indicator (CQI), rank index (RI), precoding matrix indicator (PMI), or any combination. In some example, a base station may receive the constraint indicator from the UE. The base station may then determine an updated transmission mode for the UE. In one example, the base station may determine the updated transmission mode as an updated modulation and coding scheme (MCS) for the UE based on the energy constraint and the temperature constraint. The base station may then transmit an indication of the updated transmission mode to the UE.

In some cases, the UE may determine an alternative transmission mode for communicating with the base station. In some examples, the alternative transmission mode may include an alternative bandwidth for the UE or an alternative number of blind decodes for the UE to support. In some examples, the UE may determine an amount of remaining energy for the UE (e.g., according to an identified indication of the amount of remaining energy for the UE). The UE may then determine the alternative transmission mode based on the amount of remaining energy for the UE. Additionally or alternatively, the UE may determine a temperature of the UE (e.g., according to an identified indication of the temperature of the UE) and may determine the alternative transmission mode based on the temperature of the UE. In some cases, the UE may transmit an indicator of the alternative transmission mode to the base station (e.g., an indicator of the alternative bandwidth for the UE or the alternative number of blind decodes for the UE to support) via physical layer signaling. The base station may receive the indicator of the alternative transmission mode and may utilize the indication to determine an updated transmission mode for the UE. In some cases, the updated transmission mode may include an updated bandwidth and/or an updated number of blind decodes for the UE to support.

A method of wireless communications is described. The method may include identifying, at a UE, an indication of an amount of remaining energy for the UE or an indication of a temperature of the UE, determining, by the UE, a constraint indicator based on the amount of remaining energy for the UE or the temperature of the UE, and transmitting, to a base station via physical layer signaling, the constraint indicator.

An apparatus for wireless communications is described. In some cases, the apparatus may be a UE. The apparatus may include a processor, memory in electronic communication with the processor, and instructions stored in the memory. The instructions may be executable by the processor to cause the apparatus to identify, at the UE, an indication of an amount of remaining energy for the UE or an indication of a temperature of the UE, determine, by the UE, a constraint indicator based on the amount of remaining energy for the UE or the temperature of the UE, and transmit, to a base station via physical layer signaling, the constraint indicator.

Another apparatus for wireless communications is described. In some cases, the apparatus may be a UE. The apparatus may include means for identifying, at the UE, an indication of an amount of remaining energy for the UE or an indication of a temperature of the UE, determining, by the UE, a constraint indicator based on the amount of remaining energy for the UE or the temperature of the UE, and transmitting, to a base station via physical layer signaling, the constraint indicator.

A non-transitory computer-readable medium storing code for wireless communications is described. The code may include instructions executable by a processor to identify, at a UE, an indication of an amount of remaining energy for the UE or an indication of a temperature of the UE, determine, by the UE, a constraint indicator based on the amount of remaining energy for the UE or the temperature of the UE, and transmit, to a base station via physical layer signaling, the constraint indicator.

In some examples of the method, apparatuses, and non-transitory computer-readable medium described herein, transmitting the constraint indicator may include operations, features, means, or instructions for transmitting the constraint indicator via a physical layer transmission including a CQI, RI, PMI, or any combination thereof.

Some examples of the method, apparatuses, and non-transitory computer-readable medium described herein may further include operations, features, means, or instructions for determining a first value for a CQI, RI, or PMI, determining a second value for the CQI, RI, or PMI, the second value based on the amount of remaining energy for the UE or the temperature of the UE and transmitting, to the base station via physical layer signaling, the first value for the CQI, RI, or PMI and the second value for the CQI, RI, or PMI.

Some examples of the method, apparatuses, and non-transitory computer-readable medium described herein may further include operations, features, means, or instructions for receiving, from the base station via physical layer signaling, an indicator of an updated value for the CQI, RI, or PMI, the updated value for the CQI, RI, or PMI based on the second value for the CQI, RI, or PMI.

Some examples of the method, apparatuses, and non-transitory computer-readable medium described herein may further include operations, features, means, or instructions for receiving, from the base station via physical layer signaling, an indicator of an updated MCS, the updated MCS based on the constraint indicator. In some examples of the method, apparatuses, and non-transitory computer-readable medium described herein, the updated MCS may be based on an amount of pending data to be delivered to the UE.

Some examples of the method, apparatuses, and non-transitory computer-readable medium described herein may further include operations, features, means, or instructions for receiving, from the base station via physical layer signaling, an indicator of an updated RI, the updated RI based on the constraint indicator. In some examples of the method, apparatuses, and non-transitory computer-readable medium described herein, the updated RI may be based on an amount of pending data to be delivered to the UE.

Some examples of the method, apparatuses, and non-transitory computer-readable medium described herein may further include operations, features, means, or instructions for receiving, from the base station via physical layer signaling, an indicator of an updated bandwidth information, the updated bandwidth information based on the constraint indicator.

In some examples of the method, apparatuses, and non-transitory computer-readable medium described herein, the updated bandwidth information includes an updated number of component carriers (CCs) or bandwidth parts (BWPs).

In some examples of the method, apparatuses, and non-transitory computer-readable medium described herein, the updated bandwidth information includes discontinuation of a dual connectivity configuration.

Some examples of the method, apparatuses, and non-transitory computer-readable medium described herein may further include operations, features, means, or instructions for determining, by the UE, an alternative bandwidth information based on the amount of remaining energy for the UE or the temperature of the UE and transmitting, to the base station via physical layer signaling, an indicator of the alternative bandwidth information.

In some examples of the method, apparatuses, and non-transitory computer-readable medium described herein, the alternative bandwidth information includes an alternative number of CCs or BWPs. Some examples of the method, apparatuses, and non-transitory computer-readable medium described herein may further include operations, features, means, or instructions for receiving, from the base station via physical layer signaling, an indicator of an updated number of blind decodes to support, the updated number of blind decodes to support based on the constraint indicator.

Some examples of the method, apparatuses, and non-transitory computer-readable medium described herein may further include operations, features, means, or instructions for determining, by the UE, an alternative number of blind decodes to support based on the amount of remaining energy for the UE or the temperature of the UE and transmitting, to the base station via physical layer signaling, an indicator of the alternative number of blind decodes to support.

In some examples of the method, apparatuses, and non-transitory computer-readable medium described herein, determining the constraint indicator may include operations, features, means, or instructions for selecting, from a set of discrete values, a discrete value for the constraint indicator.

Some examples of the method, apparatuses, and non-transitory computer-readable medium described herein may further include operations, features, means, or instructions for determining that the amount of remaining energy for the UE may be below a threshold amount of remaining energy or that the temperature of the UE above a threshold temperature and determining to transmit the constraint indicator based on the amount of remaining energy for the UE being below the threshold amount of remaining energy or the temperature of the UE being above the threshold temperature.

Some examples of the method, apparatuses, and non-transitory computer-readable medium described herein may further include operations, features, means, or instructions for receiving, from the base station via physical layer signaling, an indicator of the threshold amount of remaining energy or the threshold temperature. In some examples of the method, apparatuses, and non-transitory computer-readable medium described herein, the physical layer signaling includes a physical uplink control channel (PUCCH) transmission.

A method of wireless communications is described. The method may include identifying, at a UE, an indication of an amount of remaining energy for the UE or an indication of a temperature of the UE, determining, by the UE, an alternative transmission mode, the alternative transmission mode including an alternative bandwidth information or an alternative number of blind decodes to support, the alternative transmission mode based on the amount of remaining energy for the UE or the temperature of the UE, and transmitting, to a base station via physical layer signaling, an indicator of the alternative transmission mode.

An apparatus for wireless communications is described. The apparatus may include a processor, memory in electronic communication with the processor, and instructions stored in the memory. The instructions may be executable by the processor to cause the apparatus to identify, at a UE, an indication of an amount of remaining energy for the UE or an indication of a temperature of the UE, determine, by the UE, an alternative transmission mode, the alternative transmission mode including an alternative bandwidth information or an alternative number of blind decodes to support, the alternative transmission mode based on the amount of remaining energy for the UE or the temperature of the UE, and transmit, to a base station via physical layer signaling, an indicator of the alternative transmission mode.

Another apparatus for wireless communications is described. The apparatus may include means for identifying, at a UE, an indication of an amount of remaining energy for the UE or an indication of a temperature of the UE, determining, by the UE, an alternative transmission mode, the alternative transmission mode including an alternative bandwidth information or an alternative number of blind decodes to support, the alternative transmission mode based on the amount of remaining energy for the UE or the temperature of the UE, and transmitting, to a base station via physical layer signaling, an indicator of the alternative transmission mode.

A non-transitory computer-readable medium storing code for wireless communications is described. The code may include instructions executable by a processor to identify, at a UE, an indication of an amount of remaining energy for the UE or an indication of a temperature of the UE, determine, by the UE, an alternative transmission mode, the alternative transmission mode including an alternative bandwidth information or an alternative number of blind decodes to support, the alternative transmission mode based on the amount of remaining energy for the UE or the temperature of the UE, and transmit, to a base station via physical layer signaling, an indicator of the alternative transmission mode.

In some examples of the method, apparatuses, and non-transitory computer-readable medium described herein, transmitting the indicator of the alternative transmission mode may include operations, features, means, or instructions for transmitting the indicator of the alternative transmission mode via a physical layer transmission including a CQI, RI, PMI, or any combination thereof.

Some examples of the method, apparatuses, and non-transitory computer-readable medium described herein may further include operations, features, means, or instructions for receiving, from the base station via physical layer signaling, an indicator of an updated bandwidth information, the updated bandwidth information based on the indicator of the alternative transmission mode.

In some examples of the method, apparatuses, and non-transitory computer-readable medium described herein, the updated bandwidth information includes an updated number of CCs or BWPs. In some examples of the method, apparatuses, and non-transitory computer-readable medium described herein, the updated bandwidth information includes discontinuation of a dual connectivity configuration.

In some examples of the method, apparatuses, and non-transitory computer-readable medium described herein, the updated bandwidth information may be based on an amount of pending data to be delivered to the UE. In some examples of the method, apparatuses, and non-transitory computer-readable medium described herein, the alternative bandwidth information includes an alternative number of CCs or BWPs.

Some examples of the method, apparatuses, and non-transitory computer-readable medium described herein may further include operations, features, means, or instructions for receiving, from the base station via physical layer signaling, an indicator of an updated number of blind decodes to support, the updated number of blind decodes to support based on the indicator of the alternative transmission mode.

In some examples of the method, apparatuses, and non-transitory computer-readable medium described herein, the updated number of blind decodes to support may be based on an amount of pending data to be delivered to the UE.

Some examples of the method, apparatuses, and non-transitory computer-readable medium described herein may further include operations, features, means, or instructions for determining, by the UE, a constraint indicator based on the amount of remaining energy for the UE or the temperature of the UE and transmitting, to the base station via physical layer signaling, the constraint indicator.

Some examples of the method, apparatuses, and non-transitory computer-readable medium described herein may further include operations, features, means, or instructions for receiving, from the base station via physical layer signaling, an indicator of an updated bandwidth information, the updated bandwidth information based on the constraint indicator.

Some examples of the method, apparatuses, and non-transitory computer-readable medium described herein may further include operations, features, means, or instructions for receiving, from the base station via physical layer signaling, an indicator of an updated number of blind decodes to support, the updated number of blind decodes to support based on the constraint indicator.

In some examples of the method, apparatuses, and non-transitory computer-readable medium described herein, determining the constraint indicator may include operations, features, means, or instructions for selecting, from a set of discrete values, a discrete value for the constraint indicator.

Some examples of the method, apparatuses, and non-transitory computer-readable medium described herein may further include operations, features, means, or instructions for determining that the amount of remaining energy for the UE may be below a threshold amount of remaining energy or that the temperature of the UE above a threshold temperature and determining to transmit the indicator of the alternative transmission mode based on the amount of remaining energy for the UE being below the threshold amount of remaining energy or the temperature of the UE being above the threshold temperature.

Some examples of the method, apparatuses, and non-transitory computer-readable medium described herein may further include operations, features, means, or instructions for receiving, from the base station via physical layer signaling, an indicator of the threshold amount of remaining energy or the threshold temperature.

In some examples of the method, apparatuses, and non-transitory computer-readable medium described herein, the physical layer signaling includes a PUCCH transmission.

A method of wireless communications is described. The method may include receiving, from a UE via physical layer signaling, a constraint indicator based on an amount of remaining energy for the UE or a temperature of the UE, determining, based on the constraint indicator, an updated transmission mode for the UE, and transmitting, to the UE via physical layer signaling, an indicator of the updated transmission mode.

An apparatus for wireless communications is described. The apparatus may include a processor, memory in electronic communication with the processor, and instructions stored in the memory. The instructions may be executable by the processor to cause the apparatus to receive, from a UE via physical layer signaling, a constraint indicator based on an amount of remaining energy for the UE or a temperature of the UE, determine, based on the constraint indicator, an updated transmission mode for the UE, and transmit, to the UE via physical layer signaling, an indicator of the updated transmission mode.

Another apparatus for wireless communications is described. The apparatus may include means for receiving, from a UE via physical layer signaling, a constraint indicator based on an amount of remaining energy for the UE or a temperature of the UE, determining, based on the constraint indicator, an updated transmission mode for the UE, and transmitting, to the UE via physical layer signaling, an indicator of the updated transmission mode.

A non-transitory computer-readable medium storing code for wireless communications is described. The code may include instructions executable by a processor to receive, from a UE via physical layer signaling, a constraint indicator based on an amount of remaining energy for the UE or a temperature of the UE, determine, based on the constraint indicator, an updated transmission mode for the UE, and transmit, to the UE via physical layer signaling, an indicator of the updated transmission mode.

In some examples of the method, apparatuses, and non-transitory computer-readable medium described herein, receiving the constraint indicator may include operations, features, means, or instructions for receiving the constraint indicator via a physical layer transmission including a CQI, RI, PMI, or any combination thereof.

Some examples of the method, apparatuses, and non-transitory computer-readable medium described herein may further include operations, features, means, or instructions for receiving, from the UE via physical layer signaling, a first value for a CQI, RI, or PMI, receiving, from the UE via physical layer signaling, a second value for the CQI, RI, or PMI, the second value for the CQI, RI, or PMI based on the amount of remaining energy for the UE or the temperature of the UE, determining, based on the constraint indicator, an updated value for the CQI, RI, or PMI, the updated value for the CQI, RI, or PMI based on the second value for the CQI, RI, or PMI and transmitting, to the UE via physical layer signaling, the indicator of the updated value for the CQI, RI, or PMI.

In some examples of the method, apparatuses, and non-transitory computer-readable medium described herein, determining the updated transmission mode may include operations, features, means, or instructions for determining, based on the constraint indicator, an updated MCS for the UE.

In some examples of the method, apparatuses, and non-transitory computer-readable medium described herein, the updated MCS for the UE may be based on an amount of pending data to be delivered to the UE.

In some examples of the method, apparatuses, and non-transitory computer-readable medium described herein, determining the updated transmission mode may include operations, features, means, or instructions for determining, based on the constraint indicator, an updated RI for the UE.

In some examples of the method, apparatuses, and non-transitory computer-readable medium described herein, the updated RI for the UE may be based on an amount of pending data to be delivered to the UE.

In some examples of the method, apparatuses, and non-transitory computer-readable medium described herein, determining the updated transmission mode may include operations, features, means, or instructions for determining, based on the constraint indicator, an updated bandwidth information for the UE.

In some examples of the method, apparatuses, and non-transitory computer-readable medium described herein, determining the updated transmission mode further may include operations, features, means, or instructions for receiving, from the UE via physical layer signaling, an indicator of an alternative bandwidth information, the alternative bandwidth information based on the amount of remaining energy for the UE or the temperature of the UE and determining, based on the indicator of the alternative bandwidth information, the updated bandwidth information for the UE.

In some examples of the method, apparatuses, and non-transitory computer-readable medium described herein, the updated bandwidth information for the UE may be based on an amount of pending data to be delivered to the UE. In some examples of the method, apparatuses, and non-transitory computer-readable medium described herein, the updated bandwidth information includes an updated number of CCs or BWPs.

In some examples of the method, apparatuses, and non-transitory computer-readable medium described herein, the updated bandwidth information includes discontinuation of a dual connectivity configuration.

In some examples of the method, apparatuses, and non-transitory computer-readable medium described herein, determining the updated transmission mode further may include operations, features, means, or instructions for receiving, from the UE via physical layer signaling, an indicator of an alternative number of blind decodes for the UE to support, the alternative number of blind decodes for the UE to support based on the amount of remaining energy for the UE or the temperature of the UE and determining, based on the indicator of the alternative number of blind decodes for the UE to support, an updated number of blind decodes for the UE to support.

In some examples of the method, apparatuses, and non-transitory computer-readable medium described herein, the updated number of blind decodes for the UE to support may be based on an amount of pending data to be delivered to the UE.

In some examples of the method, apparatuses, and non-transitory computer-readable medium described herein, determining the updated transmission mode may include operations, features, means, or instructions for determining, based on the constraint indicator, an updated number of blind decodes for the UE to support.

In some examples of the method, apparatuses, and non-transitory computer-readable medium described herein, the constraint indicator includes a discrete value, the discrete value being one of a set of possible discrete values.

Some examples of the method, apparatuses, and non-transitory computer-readable medium described herein may further include operations, features, means, or instructions for determining, for the UE, a threshold amount of remaining energy or a threshold temperature and configuring the UE to transmit the constraint indicator based on the amount of remaining energy for the UE being below the threshold amount of remaining energy or the temperature of the UE being above the threshold temperature. In some examples of the method, apparatuses, and non-transitory computer-readable medium described herein, the physical layer signaling includes a PUCCH transmission.

A method of wireless communications is described. The method may include receiving, from a UE via physical layer signaling, an indicator of an alternative transmission mode for the UE, the alternative transmission mode including an alternative bandwidth information or an alternative number of blind decodes to support based on an amount of remaining energy for the UE or a temperature of the UE, determining, based on the indicator of the alternative transmission mode, an updated transmission mode for the UE, the updated transmission mode including an updated bandwidth information for the UE or an updated number of blind decodes for the UE to support, and transmitting, to the UE via physical layer signaling, an indicator of the updated transmission mode.

An apparatus for wireless communications is described. The apparatus may include a processor, memory in electronic communication with the processor, and instructions stored in the memory. The instructions may be executable by the processor to cause the apparatus to receive, from a UE via physical layer signaling, an indicator of an alternative transmission mode for the UE, the alternative transmission mode including an alternative bandwidth information or an alternative number of blind decodes to support based on an amount of remaining energy for the UE or a temperature of the UE, determine, based on the indicator of the alternative transmission mode, an updated transmission mode for the UE, the updated transmission mode including an updated bandwidth information for the UE or an updated number of blind decodes for the UE to support, and transmit, to the UE via physical layer signaling, an indicator of the updated transmission mode.

Another apparatus for wireless communications is described. The apparatus may include means for receiving, from a UE via physical layer signaling, an indicator of an alternative transmission mode for the UE, the alternative transmission mode including an alternative bandwidth information or an alternative number of blind decodes to support based on an amount of remaining energy for the UE or a temperature of the UE, determining, based on the indicator of the alternative transmission mode, an updated transmission mode for the UE, the updated transmission mode including an updated bandwidth information for the UE or an updated number of blind decodes for the UE to support, and transmitting, to the UE via physical layer signaling, an indicator of the updated transmission mode.

A non-transitory computer-readable medium storing code for wireless communications is described. The code may include instructions executable by a processor to receive, from a UE via physical layer signaling, an indicator of an alternative transmission mode for the UE, the alternative transmission mode including an alternative bandwidth information or an alternative number of blind decodes to support based on an amount of remaining energy for the UE or a temperature of the UE, determine, based on the indicator of the alternative transmission mode, an updated transmission mode for the UE, the updated transmission mode including an updated bandwidth information for the UE or an updated number of blind decodes for the UE to support, and transmit, to the UE via physical layer signaling, an indicator of the updated transmission mode.

In some examples of the method, apparatuses, and non-transitory computer-readable medium described herein, receiving the indicator of the alternative transmission mode may include operations, features, means, or instructions for receiving the indicator of the alternative transmission mode via a physical layer transmission including a CQI, RI, PMI, or any combination thereof.

In some examples of the method, apparatuses, and non-transitory computer-readable medium described herein, the physical layer signaling includes a PUCCH transmission.

DETAILED DESCRIPTION

Figure 1:
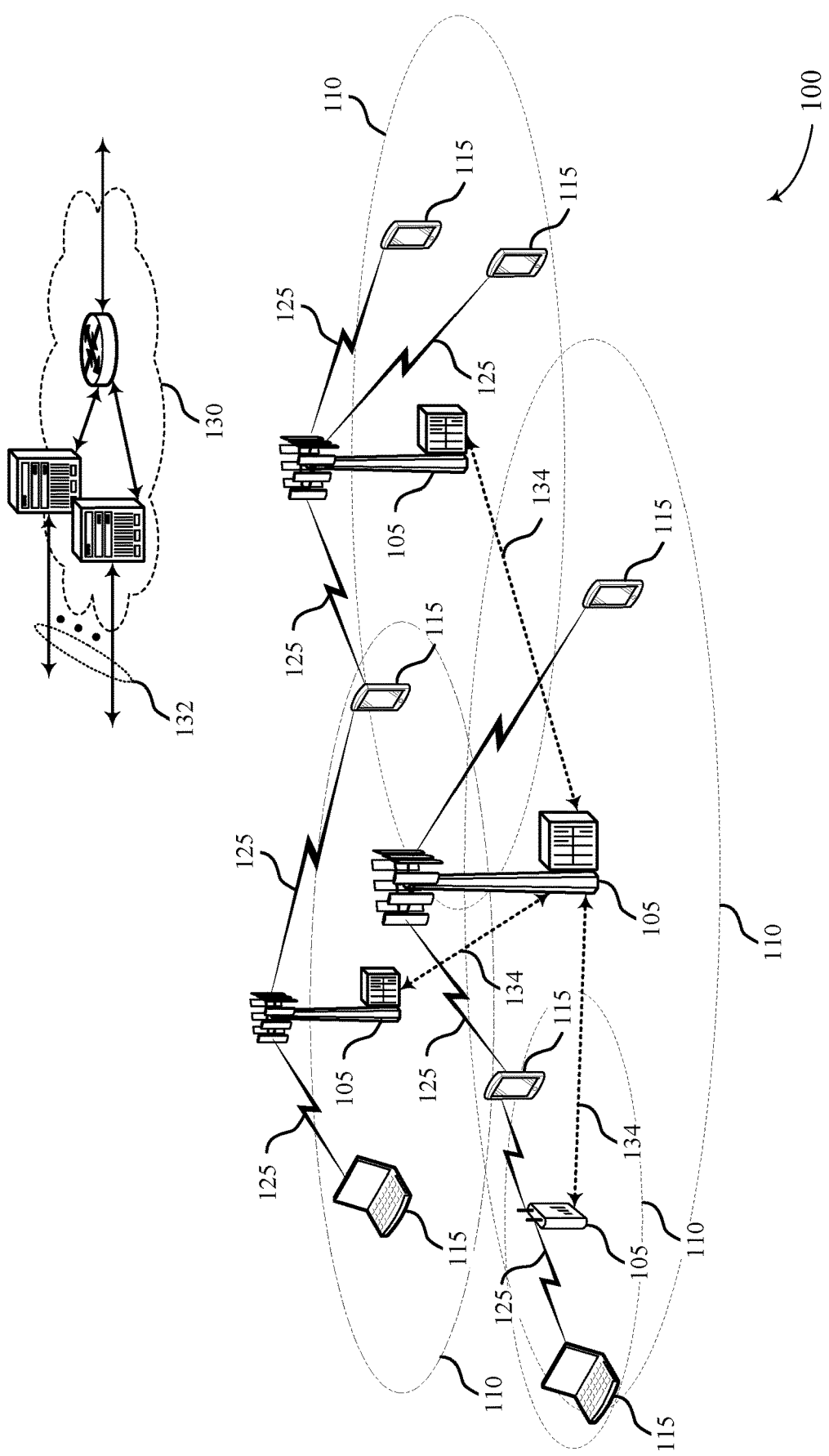
FIG. 1 illustrates an example of a wireless communications system that supports indicating energy and thermal constraints in a wireless communications system in accordance with aspects of the present disclosure.

In some wireless communications systems (e.g., fifth generation (5G) or millimeter wave (mmW) communications systems), base stations and user equipments (UEs) are configured with multiple antennas, which may be used for directional or beamformed transmissions. UEs may be configured with a number of antenna sub-arrays, and each sub-array may be connected with multiple radio frequency (RF) chains (e.g., chains of RF circuitry related to operating the sub-array). The use of an increased number of antennas and an increased amount of RF circuitry may contribute to increased energy consumption at the UE. Further, use of an increased number of antennas and an increased amount of RF circuitry may also lead to a temperature increase at the UE. A UE may not be able to meet its performance requirements if an amount of remaining energy at the UE is below a threshold. Additionally or alternatively, a thermal overload at the UE may lead the UE to shut down which in turn may lead to a loss in service, or may render the UE uncomfortably hot for a user. Thus, there exists a need to efficiently manage energy and thermal constraints of a UE.

In some examples, a UE may identify an amount of remaining energy for the UE (e.g., via an indication of the amount of remaining energy). The UE may alternatively or additionally identify a temperature of the UE (e.g., via an indication of the temperature). The UE may identify a constraint indicator. The constraint indicator may be based on the amount of remaining energy for the UE (and thus comprise an energy indicator), may be based on the temperature of the UE (and thus comprise a temperature indicator), or may be based on both the amount of remaining energy for the UE and the temperature of the UE. In some examples, the UE may select a discrete value for the constraint indicator. In some cases, the UE may select the discrete value from a set of discrete values. For example, the UE may select a first discrete value for the energy indicator and a second discrete value for the temperature indicator. The UE may then combine the first discrete value and the second discrete value to determine a discrete value for the constraint indicator. In one example, both the energy indicator and the thermal indicator may be quantized values indicated by 2 bits. For example, a 2 bit energy indicator may indicate 4 levels of quantization. In some cases, the quantization levels for the energy indicator may range between 0% and 100% of remaining energy. Additionally or alternatively, a 2 bit temperature indicator may indicate 4 levels of quantization. In some cases, the quantization levels for the temperature indicator may range between 4 levels of temperature of the UE. In some cases, the quantization may be uniform (e.g., may provide uniform granularity throughout a range of remaining energy amounts or temperatures). Alternatively, in some cases, the quantization may be non-uniform (e.g., may provide increased granularity for some portions of the range of remaining energy amounts or temperatures than for other portions of the range of remaining energy amounts or temperatures).

In some cases, the UE may be configured to transmit the constraint indicator to a base station via physical layer signaling. For example, the UE may transmit the constraint indicator via a physical layer transmission that includes a channel quality indicator (CQI), rank index (RI), precoding matrix indicator (PMI), or any combination thereof. In some cases, the UE may periodically transmit the constraint indicator (energy indicator or temperature indicator or both) to the base station via physical layer signaling. In some cases, the UE may determine a first value for a CQI, RI, or PMI. For example, the UE may determine a CQI value corresponding to a highest modulation and coding scheme (MCS) that may be supported by the UE. Additionally, the UE may determine an RI corresponding to the maximum number of layers and/or streams of multiple input multiple output (MIMO) transmissions or receptions supported by the UE. The UE may further determine a PMI corresponding to a precoder index associated with the UE from a codebook of precoders. Upon determining the first value for the CQI, RI and PMI, the UE may transmit the first value to the base station. The UE may also determine a second (e.g., alternative) value for the CQI, RI, or PMI. In some cases, the second value may be based on the amount of remaining energy for the UE or the temperature of the UE. In some cases, the second value for the CQI, RI, or PMI may be related to an energy and/or thermally efficient performance of the UE. The UE may then transmit the second value for the CQI, RI, or PMI to the base station. In some cases, both the first value and the second value may be transmitted via physical layer signaling.

In some cases, the base station may receive a constraint indicator from the UE via physical layer signaling. Upon receiving the constraint indicator, the base station may determine an updated transmission mode for the UE. In some examples, the updated transmission mode may be based on the received constraint indicator. The base station may further transmit an indicator of the updated transmission mode to the UE. In some examples, the updated transmission mode may include an updated MCS, rank, precoding matrix, bandwidth (e.g., number of component carriers (CCs) or bandwidth parts (BWPs), number of blind decodes to support, or other transmission/reception parameters for the UE.

In some cases, the UE may determine an alternative transmission mode for communicating with the base station. For example, the alternative transmission mode may include an alternative bandwidth or an alternative number of blind decodes to support. In some examples, the UE may determine the alternative transmission mode based on the amount of remaining energy for the UE or the temperature of the UE. In addition or in alternative to a CQI, RI, or PMI, the UE may additionally transmit an indicator of the alternative transmission mode to the base station via physical layer signaling. In some examples, the UE may request that a base station deactivate one or more CCs or require the UE to support a different number of blind decodes based on an amount of remaining energy for the UE or a temperature of the UE. For example, the UE may transmit an indication of the alternative number of CCs or the alternative number of blind decodes to support to the base station. In some cases, the base station may utilize the indication to determine an updated transmission mode for the UE, which may include an updated bandwidth for the UE or an updated number of blind decodes for the UE to support.

Aspects of the disclosure are initially described in the context of a wireless communications system. Aspects of the disclosure are further illustrated by and described with reference to apparatus diagrams, system diagrams, and flowcharts that relate to indicating energy and thermal constraints in a wireless communications system.

FIG. 1 illustrates an example of a wireless communications system 100 that supports indicating energy and thermal constraints in a wireless communications system in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some embodiments of the wireless communications system 100, a UE 115 may identify an indication of an amount of remaining energy for the UE 115. In some cases, the UE 115 may instead or may also identify an indication of a temperature of the UE 115. The UE 115 may then determine a constraint indicator based on the amount of remaining energy for the UE 115 and/or the temperature of the UE 115. In some cases, the UE 115 may transmit the constraint indicator to the base station 105. The constraint indicator may be transmitted to the base station 105 via physical layer signaling.

According to one or more aspects of the present disclosure, the UE 115 may identify an indication of an amount of remaining energy for the UE 115 and/or an indication of a temperature of the UE 115. Additionally, the UE 115 may determine an alternative transmission mode based on the amount of remaining energy for the UE 115 and/or the temperature of the UE 115. In some cases, the alternative transmission mode may include an alternative bandwidth or an alternative number of blind decodes to support. Upon determining the alternative transmission mode, the UE 115 may transmit an indicator of the alternative transmission mode to a base station 105 via physical layer signaling. Various examples of such signaling are described further below.

Figure 2:
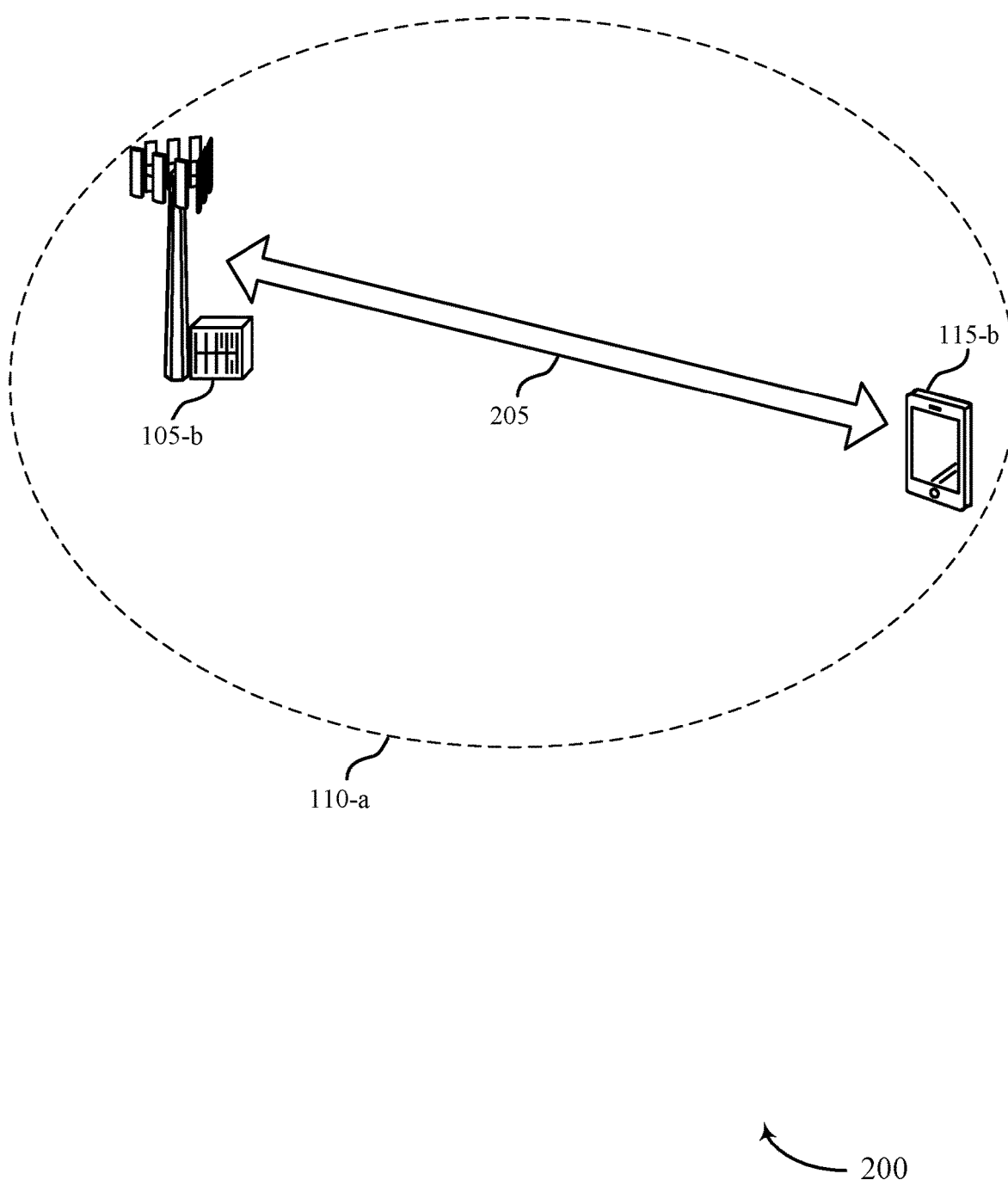
FIG. 2 illustrates an example of a wireless communications system that supports indicating energy and thermal constraints in a wireless communications system in accordance with aspects of the present disclosure.

FIG. 2 illustrates an example of a wireless communications system 200 that supports indicating energy and thermal constraints in a wireless communications system in accordance with aspects of the present disclosure. In some examples, the wireless communications system 200 may implement aspects of wireless communications system 100. In some examples, the wireless communications system 200 may include a base station 105-*a* and UE 115-*a*, which may be examples of the corresponding devices as described with reference to FIG. 1. UE 115-*a* may communicate with the base station 105-*a* within a coverage area 110-*a*.

In some examples, the base station 105-*a* and the UE 115-*a* may be configured to perform in a mmW system. In some cases, the base station 105-*a* may be configured with multiple antennas, which may be used for directional or beamformed transmissions. Similarly, the UE 115-*a* may be configured with multiple antennas, which may be used for directional or beamformed transmissions. In some examples, the base station 105-*a* and/or the UE 115-*a* may transmit a number of beamformed communication beams in different directions within a coverage area. In some cases, the base station 105-*a* may be configured with a large number of antennas communicating at mmW carrier frequencies (such as 28 GHz). Similarly, the UE 115-*a* may be configured with a large number of antenna sub-arrays (such as 4 sub-arrays). In some case, the antenna sub-arrays included in the UE 115-*a* may be used for providing modular coverage. More specifically, in mmW systems, a first sub-array of the UE 115-*a* may be configured to cover a first direction and a second sub-array of the UE 115-*a* may be configured to cover a second direction. By using each sub-array for a different direction, the UE 115-*a* may efficiently cover an allocated link budget.

Systems operating in mmW carrier frequencies may be vulnerable to propagation loss. In some examples, each sub-array in the UE 115-*a* may be connected with multiple RF chains and each RF chain circuitry may be configured to operate at a high frequency (e.g., 28 GHz). As a result, when multiple sub-arrays are each connected to multiple RF chains, then the UE 115-*a* may burn a large amount of energy (e.g., operating an increased number of antennas and increased number of RF chains may consume an increased amount of energy). For example, if the UE 115-*a* includes multiple RF chains operating at a higher frequency as well as at a higher bandwidth, then the UE 115-*a* may burn a large amount of energy. Additionally or alternatively, use of multiple antennas (and associated RF chains) may also lead to a high temperature at the UE 115-*a*. In some examples, the UE 115-*a* may determine whether a temperature at the UE satisfies a threshold. In some cases, a high temperature (such as a thermal overload) at the UE 115-*a* may lead the UE 115-*a* to shut down. In some cases, the UE 115-*a* may not shut down completely, and may only shut down a mmW radio included in the UE 115-*a*. This however may lead to a loss in service and a drop in performance. The present disclosure relates to systems and methods for indicating energy or thermal constraints for a UE to a base station, and related coordination between the UE and base station to manage such constraints.

In mmW systems supporting beamforming, the UE 115-*a* may be configured to feed back a CQI, RI, and PMI. A CQI may correspond to a highest MCS (that can be successfully decoded by the UE within block error rate (BLER) constraints configured for the UE 115-*a*. An RI may correspond to number of layers and/or streams of MIMO transmissions or receptions supported by the UE 115-*a*. In some cases, the UE 115-*a* may indicate the RI if the UE 115-*a* is operating in a MIMO mode. For example, in MIMO mode, the UE 115-*a* may expect the base station 105-*a* to transmit using a predetermined number of layers. Based on the predetermined number of layers, the UE 115-*a* may indicate an RI to the base station 105-*a*. Additionally, a PMI may correspond to a precoder index associated with the UE. In some cases, the precoder index may be associated with a codebook of precoders. In some cases, the UE 115-*a* may be configured to periodically send the CQI, RI, and PMI to the base station on one or more control channels (e.g., as part of a periodic report).

In wireless communications system 200, a beamforming architecture may include a digital portion and an analog portion. More specifically, the UE 115-*a* may be configured to indicate the analog portion of the beamforming architecture by transmitting a beam index. Additionally, the UE 115-*a* may be configured to indicate the digital portion of the beamforming architecture by transmitting CQI, RI, PMI, or a combination thereof. In existing systems a higher MCS and/or higher rank in transmissions or receptions may lead to lower latency and less usage of air link resources, which may ultimately lead to a better performance. However, the use of the higher MCS and/or higher rank in transmissions or receptions may lead to a higher energy consumption per bit at the UE 115-*a*. In some examples, the energy consumed by the UE 115-*a* may change depending on a number of antennas used by the UE 115-*a*. Additionally, or alternatively, the energy consumption at the UE 115-*a* may differ based on an operating mode of the UE. For example, the UE 115-*a* may consume a first amount of energy when in a transmission mode and the UE 115-*a* may consume a second amount of energy when in a reception mode. This is because, different RF circuitry may be excited during each operating mode of the UE 115-*a* resulting in uneven energy consumption. In some cases, as more energy is consumed, the UE 115-*a* may also heat up. This necessitates a need for energy management solutions and thermal management solutions for the UE 115-*a*.

In some cases, the UE 115-*a* may identify an indication of an amount of remaining energy (e.g., an amount of remaining battery energy) for the UE 115-*a*. Additionally or alternatively, the UE 115-*a* may identify an indication of a temperature of the UE 115-*a*. The UE 115-*a* may then determine a constraint indicator based on the amount of remaining energy for the UE 115-*a* or the temperature of the UE 115-*a*. In some cases, the constraint indicator may include or be based on an energy indicator indicating the amount of remaining energy for the UE 115-*a*, and/or a temperature indicator indicating the temperature of the UE 115-*a*, or a combination of both. In some cases, the UE 115-*a* may measure the energy at an RF level, a digital level, a battery level, or a combination thereof. In some cases, the UE 115-*a* may select a discrete value for the energy indicator from a set of discrete values. As one example, the energy indicator may be a quantized value indicated by $B_E$ bits. More specifically, $B_E$ bits may relate to a $2^{B_E}$ level quantization. For example, a 2 bit energy indicator may indicate 4 levels of quantization. In some cases, the quantization levels for energy indicator may range between 0% to 100%. For example, an energy indicator 00 may relate to energy level corresponding to the range of 0-25% of a maximum amount of energy remaining (e.g., maximum energy remaining corresponds to a full battery), an energy indicator 01 may relate to energy level corresponding to the range of 26-50%, an energy indicator 10 may relate to energy level corresponding to the range of 51-75%, and an energy indicator 11 may relate to energy level corresponding to the range of 76-100%. In some cases, the quantization may be uniform (e.g., a constant granularity across a range of possible energy levels). Alternatively, in some cases, the quantization may be non-uniform (e.g., greater granularity in some portions of the range of possible energy levels than in other portions of the range of possible energy levels).

In some cases, the UE 115-*a* may alternatively or additionally measure a thermal level at the UE 115-*a* and determine temperature indicator based on the thermal level at the UE 115-*a*. In some cases, the UE 115-*a* may select a discrete value for the temperature indicator from a set of discrete values. Similar to the energy indicator, the temperature indicator may be a quantized value indicated by $B_T$ bits. As previously discussed, $B_T$ bits may relate to a $2^{B_T}$ level quantization. For example, a 2 bit temperature indicator may indicate 4 levels of quantization. In some cases, the quantization levels for temperature indicator may range between a low temperature to a dangerous temperature. For example, a temperature indicator 00 may relate to temperature level corresponding to a low temperature, a temperature indicator 01 may relate to temperature level corresponding to a medium temperature, a temperature indicator 10 may relate to temperature level corresponding to a hot temperature, and a temperature indicator 11 may relate to temperature level corresponding to a dangerous or critical (e.g., shut down) temperature. Similar to energy indicator, in some cases, the quantization may be uniform. Alternatively, in some cases, the quantization may be non-uniform.

In some cases, the UE 115-*a* may be configured to transmit a constraint indicator (e.g., an energy indicator, a temperature indicator, a combination of an energy indicator and a temperature indicator, or an indicator otherwise reflective of one or more of an amount of remaining energy or a temperature for the UE) to a base station via physical layer signaling. In some examples, the UE 115-*a* may be configured to transmit the constraint indicator via a physical layer transmission that includes a CQI, a RI, a PMI or any combination thereof (e.g., as part of a periodic report that includes CQI, RI, or PMI). In existing systems, the UE 115-*a* may be configured to transmit the CQI and/or RI and/or PMI information periodically in response to a request from the base station 105-*a*. According to aspects of the present disclosure, the UE 115-*a* may be configured to additionally include the constraint indicator along with the PMI, the CQI, the RI, or any combination thereof. In some cases, the UE 115-*a* may be configured to transmit the constraint indicator to the base station via a physical layer transmission in response to an event trigger (e.g., an energy level or temperature of the UE crossing a threshold energy level or a threshold temperature) or in response to a request by the base station.

In some cases, the base station 105-*a* may receive a constraint indicator from the UE 115-*a* via physical layer signaling. In some cases, the constraint indicator may be based on an amount of remaining energy for the UE 115-*a* and/or a temperature of the UE 115-*a*. The base station 105-*a* may receive the constraint indicator as an energy indicator, temperature indicator or a combination of both. Upon receiving the constraint indicator, the base station 105-*a* may determine an updated transmission mode for the UE 115-*a*. For example, the updated transmission mode may be based on the received constraint indicator. In some cases, the base station 105-*a* may transmit an indicator of the updated transmission mode to the UE 115-*a*. More specifically, the base station 105-*a* may transmit the indicator of the updated transmission mode via physical layer signaling. In some examples, the updated transmission mode may correspond to one or more of an updated MCS, rank, precoding matrix, bandwidth (e.g., number of CCs or BWPs), number of blind decodes to support, or other transmission parameter for the UE.

According to one or more aspects of the present invention, if an energy indicator from the UE 115-*a* corresponds to low energy available at the UE 115-*a* and/or a temperature indicator from the UE 115-*a* corresponds to a high or dangerous temperature level at the UE 115-*a*, the base station 105-*a* may increase or decrease the data rate for the UE 115-*a* based on an amount of remaining data for the UE 115-*a*. For example, if the data left for the UE 115-*a* is less than a threshold amount of data, the base station 105-*a* may increase the data rate for the UE 115-*a* (e.g., to allow the UE 115-*a* to more quickly shut down receive-related hardware). Alternatively, the base station 105-*a* may also decrease the data rate for the UE 115-*a* and/or configure the UE 115-*a* so as to deliver the data with less energy per bit (e.g., if an amount of remaining data for the UE 115-*a* is indeterminate, ongoing, or above the threshold). The base station 105-*a* may alter the data rate and/or the per-bit energy consumption of the UE 115-*a* by increasing or decreasing one or more of the MCS, rank, precoding matrix, bandwidth (e.g., number of CCs or BWPs), number of blind decodes to support, or other transmission parameter for the UE.

As one example, if an energy indicator from the UE 115-*a* corresponds to low energy available at the UE 115-*a* and/or a temperature indicator from the UE 115-*a* corresponds to a high or dangerous temperature level at the UE 115-a, then the base station 105-a may determine a low rank or precoding scheme for the UE 115-a. In some cases, the base station 105-a may further configure a low MCS over a larger number of symbols along with the low rank precoding scheme instead of configuring a high rank precoding scheme with a high MCS over a smaller number of symbols. In some examples, if the base station 105-a receives an indication that the UE 115-a is running low on energy, the base station 105-a may then determine an amount of remaining data for that UE 115-a. Upon determining that the amount of remaining data is less than a threshold, the base station 105-a may determine to transmit a large amount of data at a higher MCS. In such a case, it may be more efficient to transmit a large amount of data at a higher MCS instead of transmitting the data for a longer period of time (i.e., over a large number of symbols) at a lower rate. In some cases, the base station 105-a may use a high rank or high MCS scheme for delay sensitive applications.

In some cases, the base station 105-a may determine whether to increase or decrease a rank associated with the UE 115-a. As previously discussed, rank may correspond to the number of layers and/or streams of MIMO transmissions or receptions supported by the UE 115-a. In cases where the UE 115-a has less than a threshold amount of energy left, the base station 105-a may change the rank (and corresponding data rate) associated with the UE 115-a. If the UE 115-a is operating in a MIMO mode, the base station 105-a may determine whether to increase or decrease the number of layers for communication based on a received indication of energy or indication of temperature at the UE 115-a.

In addition to the CQI, the RI, the PMI, or any combination thereof, the UE 115-a may further be configured to transmit multiple physical layer messages to the base station 105-a. Such messages may help the base station 105-a make a network-level assessment to determine an amount of remaining energy at the UE 115-a. In some cases, the UE 115-a may determine a first value for a CQI, a RI, a PMI, or a combination thereof. The UE 115-a may further determine a second (e.g., alternative) value for the CQI, the RI, the PMI, or a combination thereof. In some examples, the second value may be based on the amount of remaining energy for the UE 115-a or the temperature of the UE 115-a. In some cases, when the base station 105-a alters the transmission mode for the UE 115-a (e.g., based on a constraint indicator received from the UE 115-a), the base station 105-a may determine the updated transmission mode based on the second value for the CQI, the RI, the PMI received by the base station 105-a from the UE 115-a (e.g., in response to a constraint indicator indicating a low amount of remaining energy or a high temperature of the UE 115-a, the base station 105-a may choose a new MCS for the UE 115-a based on the second CQI value previously transmitted by the UE 115-a).

The UE 115-a may transmit the first value for the CQI, or RI, or PMI and the second value for the CQI, or RI, or PMI to the base station 105-a using physical layer signaling. In existing systems, when a UE 115-a reports a channel state information to a base station 105-a, the UE 115-a may typically be or implicitly be configured to report the highest possible CQI, RI, PMI, or a combination thereof, compatible with a channel between the base station 105-a and the UE 115-a. In some cases, the UE 115-a may be configured to transmit one or more alternative CQI, or RI, or PMI, corresponding to an energy-efficient transmission. In some cases, when the UE 115-a approaches or reaches a critical energy level and/or a critical temperature level, the UE 115-a may determine to transmit the alternative CQI, or RI, or PMI. Additionally or alternatively, the UE 115-a may transmit the alternative CQI, or RI, or PMI values in response to event triggers (e.g., threshold amounts of remaining energy or threshold temperatures) or in response to requests from the base station 105-a. In some cases, the base station 105-a may be configured to confirm the UE's 115-a transmission of alternative CQI, or RI, or PMI values.

In some cases, the UE 115-a may be optionally configured to not transmit the constraint indicators to the base station 105-a during each CQI, or RI, or PMI transmission. In some existing systems, the UE 115-a may be initiated from a sleep mode by a base station 105-a and the base station 105-a may set up a control channel. The UE 115-a may periodically send CQI, or RI, or PMI information on the control channel. According to aspects of the present disclosure, the UE 115-a may determine whether to transmit the constraint indicator according to an operating mode. For example, a UE 115-a may begin transmitting the constraint indicator if the UE 115-a operates in a low-power mode. In cases where the UE chooses not to send the constraint indicators periodically, the base station 105-a may be configured to anticipate one or more energy and temperature parameters related to the UE 115-a and may transmit data accordingly.

In some examples, the UE 115-a may determine an alternative transmission mode for communicating with the base station 105-a. In one example, the alternative transmission mode may include an alternative bandwidth for the UE or an alternative number of blind decodes for the UE to support. In some cases, the UE 115-a may determine the alternative transmission mode based on the amount of remaining energy for the UE 115-a or the temperature of the UE 115-a. Upon determining the alternative transmission mode, the UE 115-a may transmit an indicator of the alternative transmission mode to the base station 105-a. In some cases, the indicator of the alternative transmission mode may be transmission via physical layer signaling. In some cases, the UE 115-a may request the alternative transmission mode instead of transmitting a constraint indicator. In some alternative examples, the UE 115-a may request the alternative transmission mode in addition to transmitting the constraint indicator. In some cases, the UE 115-a may transmit the indicator of the alternative transmission mode via a physical layer transmission include CQI, or RI, or PMI, or a combination thereof.

In some cases, the UE 115-a may determine the amount of remaining energy for the UE 115-a and may request to deactivate one or more CCs based on the amount of remaining energy. The UE 115-a may then transmit the alternative number of CCs to the base station 105-a. In some examples, the UE 115-a may receive an indicator of an updated bandwidth from the base station 105-a. In some cases, the updated bandwidth may be based on the indicator of the alternative transmission mode. In some cases, the updated bandwidth comprises an updated number of CCs or BWPs. For example, the base station 105-a may receive an indication of the alternative number of CCs or BWPs from the UE 115-a, and may determine an updated bandwidth for the UE 115-a. In some cases, the base station 105-a may deactivate one or more CCs in accordance with the request from the UE 115-a. In one example, the UE 115-a may request to deactivate all CCs associated with one or more frequency bands (e.g., all mmW CCs). In some such cases, the base station 105-a may discontinue a dual connectivity configuration for the UE 115-a. In one example, the base station 105-a may periodically request the UE 115-a for information associated with a bandwidth and/or blind decodes. The base station 105-*a* may receive a constraint indicator and upon receiving the constraint indicator, the base station 105-*a* may request the information.

In some examples, the base station 105-*a* may configure the UE 115-*a* with a threshold associated with the energy indicator (e.g., an energy level threshold) and a threshold associated with the temperature indicator (e.g., a temperature threshold). In some cases, the base station 105-*a* may configure the UE 115-*a* with a threshold for a constraint indicator (such as a combined threshold). The UE 115-*a* may transmit a constraint indicator or an indicator of an alternative transmission mode when an amount of remaining energy for the UE or a temperature of the UE reaches a relevant threshold as configured by the base station 105-*a*.

Thus, the UE 115-*a* may transmit via physical layer signaling one or more of a constraint indicator (e.g., an energy indicator, temperature indicator, or combination thereof) or an indicator of an alternative transmission mode (e.g., an alternative bandwidth or number of blind decodes to support) based on an amount of remaining energy for the UE 115-*a* or a temperature of the UE 115-*a*, and the base station 105-*a* may alter the data rate and/or the per-bit energy consumption of the UE 115-*a* by increasing or decreasing one or more of the MCS, rank, precoding matrix, bandwidth (e.g., number of CCs or BWPs), number of blind decodes to support, or other transmission parameters for the UE based on one or more of the constraint indicator or indicator of the alternative transmission mode. In some cases, the base station 105-*a* may determine the updated transmission mode based on one or more of alternative CQI, RI, or PMI values transmitted to the base station 105-*a* by the UE 115-*a* via physical layer signaling or an amount of remaining data for the UE 115-*a*. It is to be understood that any permutation of these possibilities, alone or in any combination, is possible.

Figure 3:
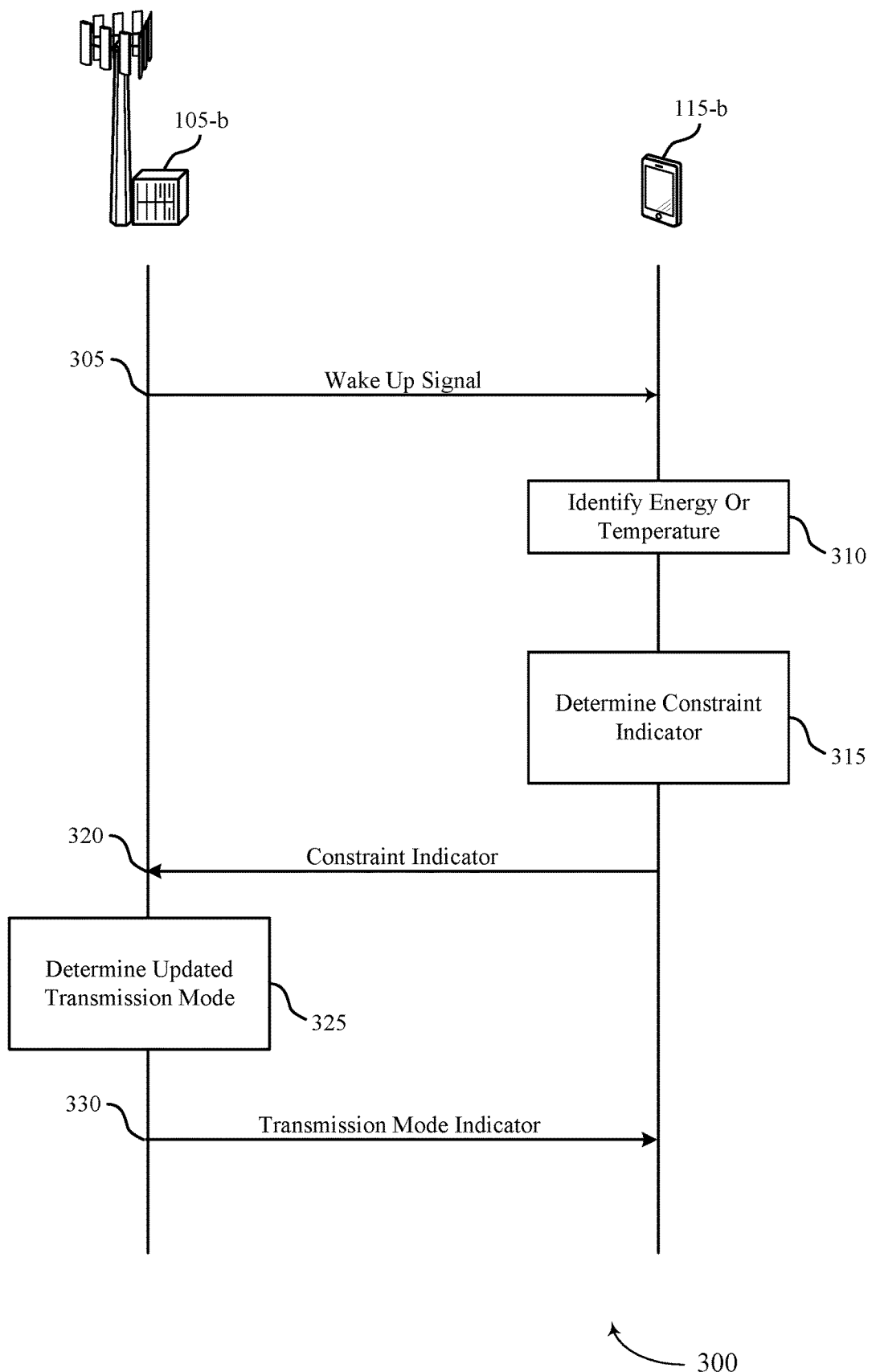
FIG. 3 illustrates an example of a process flow that supports indicating energy and thermal constraints in a wireless communications system in accordance with aspects of the present disclosure.

FIG. 3 illustrates an example of a process flow 300 that supports indicating energy and thermal constraints in a wireless communications system in accordance with aspects of the present disclosure. In some examples, the process flow 300 may implement aspects of the wireless communications system 100 and 200. Base station 105-*b* and UE 115-*b* may be examples of the corresponding devices described with reference to FIGS. 1 through 2.

In the following description of the process flow 300, the operations between the base station 105-*b* and the UE 115-*b* may be transmitted in a different order than the exemplary order shown, or the operations performed by the base station 105-*b* and the UE 115-*b* may be performed in different orders or at different times. Certain operations may also be left out of the process flow 300, or other operations may be added to the process flow 300.

At 305, the base station 105-*b* may transmit a wake up signal to the UE 115-*b* In some examples, the UE 115-*b* may be initiated from a sleep mode by the wake up signal transmitted by the base station 105-*b*. After a connection procedure, the base station 105-*b* may set up a control channel with the UE 115-*b*. The UE 115-*b* may be configured to periodically send CQI, or RI, or PMI information on the control channel.

At 310, the UE 115-*b* may identify an amount of remaining energy for the UE 115-*b* (e.g., via an indication of the amount of remaining energy). Additionally or alternatively, the UE 115-*b* may also identify a temperature of the UE 115-*b* (e.g., via an indication of the temperature of the UE 115-*b*).

At 315, the UE 115-*b* may determine a constraint indicator based on the amount of remaining energy for the UE or the temperature of the UE or both. For example, the UE 115-*b* may determine an energy indicator based on the amount of remaining energy. The UE 115-*b* may also determine a temperature indicator based on the temperature of the UE 115-*b*. In some cases, the constraint indicator may include or otherwise reflect the energy indicator, the temperature indicator, or both.

At 320, the UE 115-*b* may then transmit the constraint indicator to the base station 105-*b*. For example, the UE 115-*b* may transmit the constraint indicator via physical layer signaling. In some cases, the UE 115-*b* may transmit the constraint indicator in a physical layer transmission including a CQI, RI, PMI, or any combination thereof.

The base station 105-*b* may then receive the constraint indicator from the UE 115-*b*. As previously discussed, the constraint indicator is based on an amount of remaining energy for the UE 115-*b* or a temperature of the UE 115-*b*. In some cases, the base station 105-*b* may receive the constraint indicator via physical layer signaling.

At 325, the base station 105-*b* may determine an updated transmission mode for the UE 115-*b*. In some cases, the updated transmission mode may be based on the constraint indicator. The updated transmission mode may include one or more of an updated MCS, rank, precoding matrix, bandwidth (e.g., number of CCs or BWPs), number of blind decodes to support, or other transmission parameter for the UE 115-*b*.

At 330, the base station 105-*b* may determine an indicator of the updated transmission mode. The base station 105-*b* may then transmit the indicator of the updated transmission mode to the UE 115-*b*.

Figure 4:
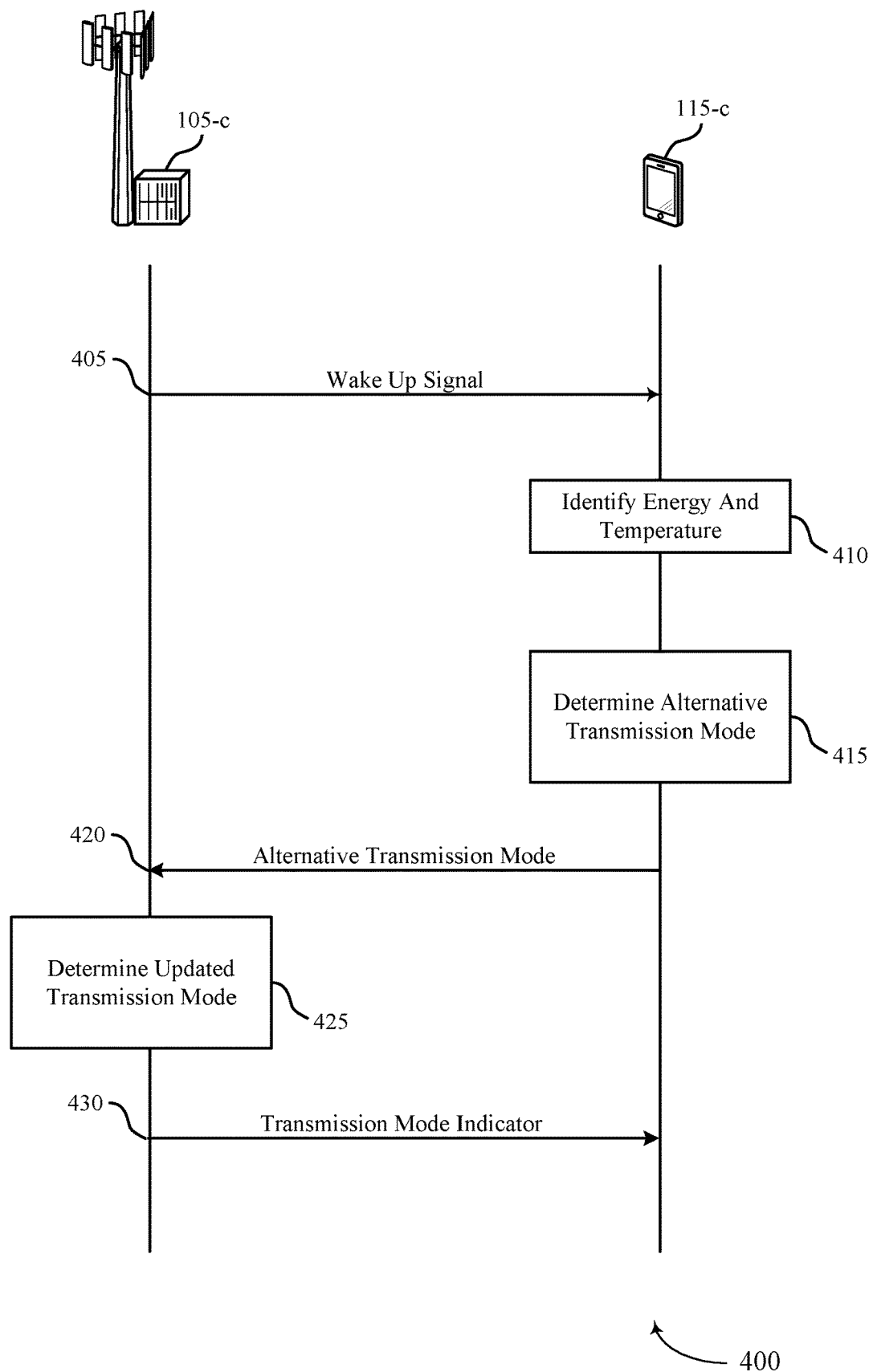
FIG. 4 illustrates an example of a process flow that supports indicating energy and thermal constraints in a wireless communications system in accordance with aspects of the present disclosure.

FIG. 4 illustrates an example of a process flow 400 that supports indicating energy and thermal constraints in a wireless communications system in accordance with aspects of the present disclosure. In some examples, the process flow 400 may implement aspects of the wireless communications system 100 and 200. Base station 105-*c* and UE 115-*c* may be examples of the corresponding devices described with reference to FIGS. 1 through 3.

In the following description of the process flow 400, the operations between the base station 105-*c* and the UE 115-*c* may be transmitted in a different order than the exemplary order shown, or the operations performed by the base station 105-*c* and the UE 115-*c* may be performed in different orders or at different times. Certain operations may also be left out of the process flow 400, or other operations may be added to the process flow 400.

At 405, the base station 105-*c* may transmit a wake up signal to the UE 115-*c*. In some examples, the base station 105-*c* may initiate a UE 115-*c* from a sleep mode. After initiating from a sleep mode, the base station 105-*c* and the UE 115-*c* may perform a connection procedure. Once the connection procedure is established, the base station 105-*c* may set up a control channel with the UE 115-*c*.

At 410, the UE 115-*c* may identify an amount of remaining energy for the UE 115-*c* (e.g., via an indication of the amount of remaining energy). Additionally or alternatively, the UE 115-*c* may identify a temperature of the UE 115-*c* (e.g., via an indication of the temperature of the UE 115-*c*).

At 415, the UE 115-*c* may determine an alternative transmission mode for performing communications with the base station 105-*c*. In some cases, the alternative transmission mode may include an alternative bandwidth to support. Additionally or alternatively, the alternative transmission mode may include an alternative number of blind decodes to support. In some cases, the alternative transmission mode may be based on the amount of remaining energy for the UE and/or the temperature of the UE 115-*c*.

At 420, the UE 115-c may transmit an indicator of the alternative transmission mode to the base station 105-c. In some cases, the UE 115-c may transmit the indicator via physical layer signaling. In one example, the UE 115-c may transmit the indicator of the alternative transmission mode via a physical layer transmission comprising a CQI, RI, PMI, or any combination thereof.

At 425, the base station 105-c determine an updated transmission mode. For example, the base station 105-c may determine an updated bandwidth and updated number of blind decodes based on the received indicator of the alternative transmission. In some cases, the updated bandwidth may include an updated number of CCs and an updated number of BWPs. For example, the base station 105-c may receive the indicator of the alternative transmission, and may determine whether to increase or decrease the number of CCs and/or the number of BWPs based on the received indicator.

At 430, the base station 105-c may transmit the indicator of the updated transmission mode to the UE 115-c. The updated transmission mode may include one or more of an updated MCS, rank, precoding matrix, bandwidth (e.g., number of CCs or BWPs), number of blind decodes to support, or other transmission parameter.

Figure 5:
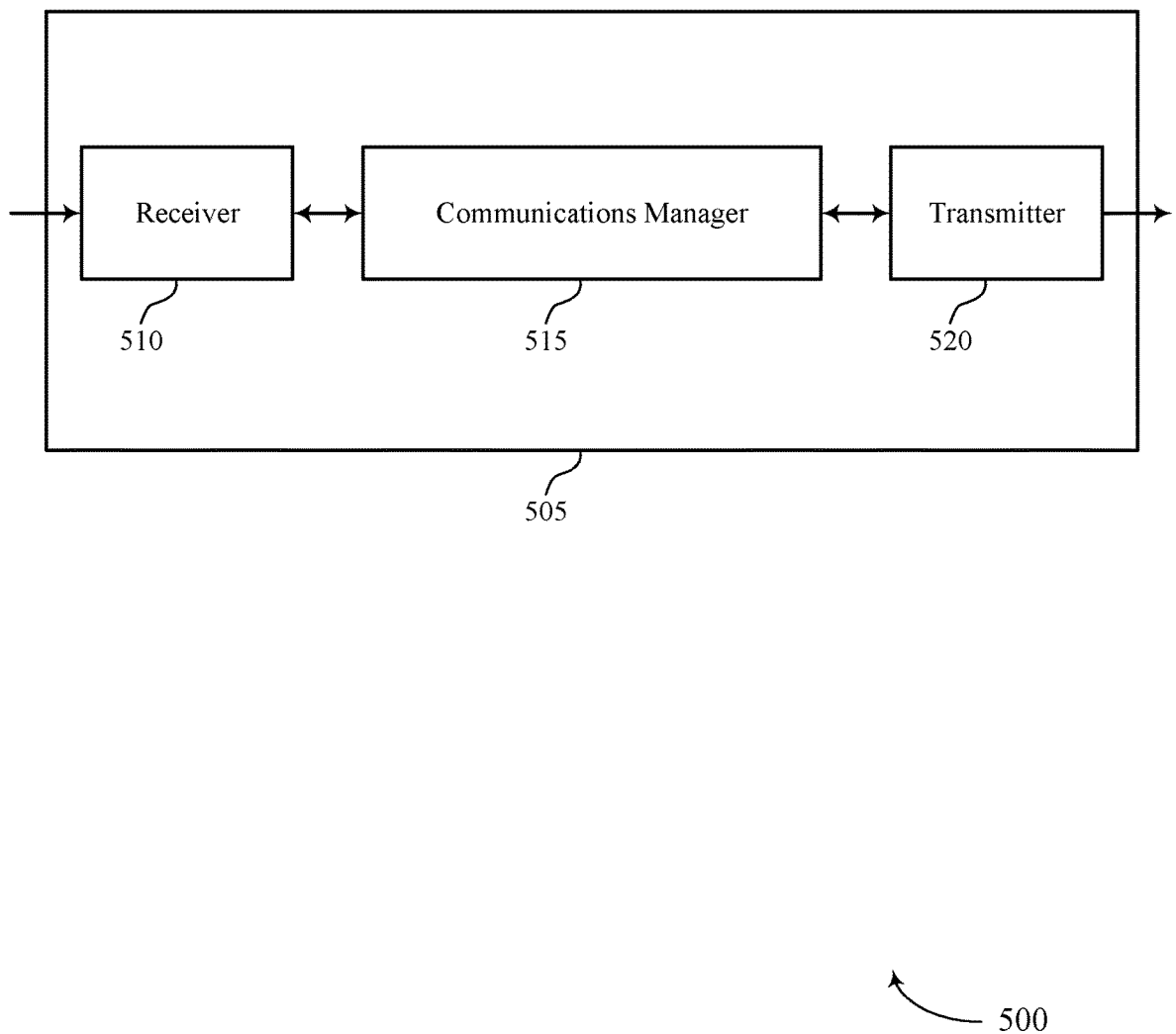
FIGS. 5 and 6 show block diagrams of devices that support indicating energy and thermal constraints in a wireless communications system in accordance with aspects of the present disclosure.

FIG. 5 shows a block diagram 500 of a device 505 that supports indicating energy and thermal constraints in a wireless communications system in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to indicating energy and thermal constraints in a wireless communications system, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify an indication of an amount of remaining energy for the UE or an indication of a temperature of the UE, determine a constraint indicator based on the amount of remaining energy for the UE or the temperature of the UE, and transmit, to a base station via physical layer signaling, the constraint indicator. The communications manager 515 may also identify, at a UE, an indication of an amount of remaining energy for the UE or an indication of a temperature of the UE, determine an alternative transmission mode, the alternative transmission mode including an alternative bandwidth or an alternative number of blind decodes to support, the alternative transmission mode based on the amount of remaining energy for the UE or the temperature of the UE, and transmit, to a base station via physical layer signaling, an indicator of the alternative transmission mode. The communications manager 515 may be an example of aspects of the communications manager 615 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
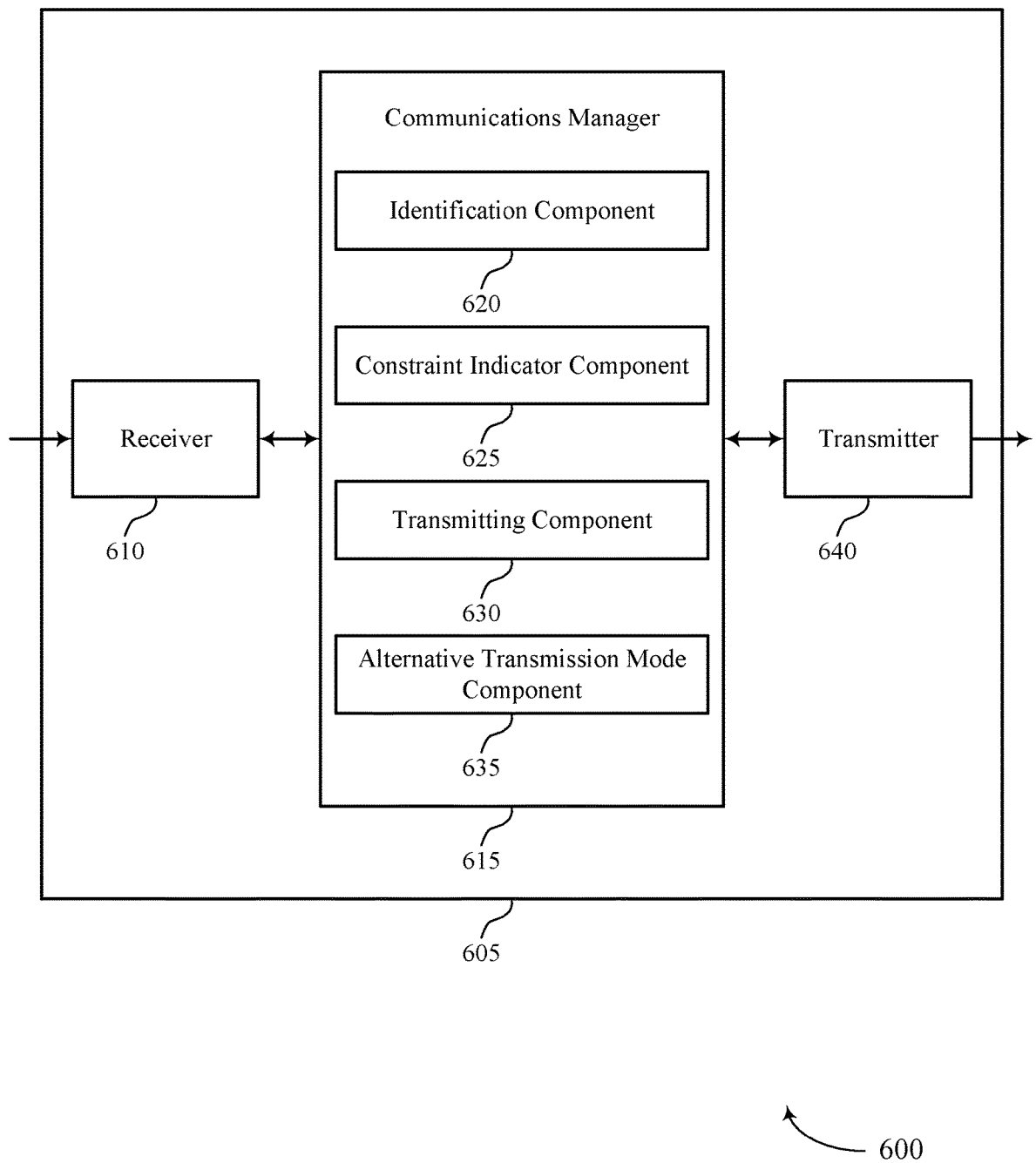

FIG. 6 shows a block diagram 600 of a device 605 that supports indicating energy and thermal constraints in a wireless communications system in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to indicating energy and thermal constraints in a wireless communications system, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an identification component 620, a constraint indicator component 625, a transmitting component 630, and an alternative transmission mode component 635. The communications manager 615 may be an example of aspects of the communications manager 515 described herein.

The identification component 620 may identify an indication of an amount of remaining energy for the UE or an indication of a temperature of the UE. The constraint indicator component 625 may determine a constraint indicator based on the amount of remaining energy for the UE or the temperature of the UE. The transmitting component 630 may transmit, to a base station via physical layer signaling, the constraint indicator. In some cases, the transmitting component 630 may be co-located with the transmitter 640.

The identification component 620 may identify an indication of an amount of remaining energy for the UE or an indication of a temperature of the UE. The alternative transmission mode component 635 may determine an alternative transmission mode. In some cases, the alternative transmission mode may include an alternative bandwidth or an alternative number of blind decodes to support, the alternative transmission mode based on the amount of remaining energy for the UE or the temperature of the UE. The transmitting component 630 may then transmit, to a base station via physical layer signaling, an indicator of the alternative transmission mode.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
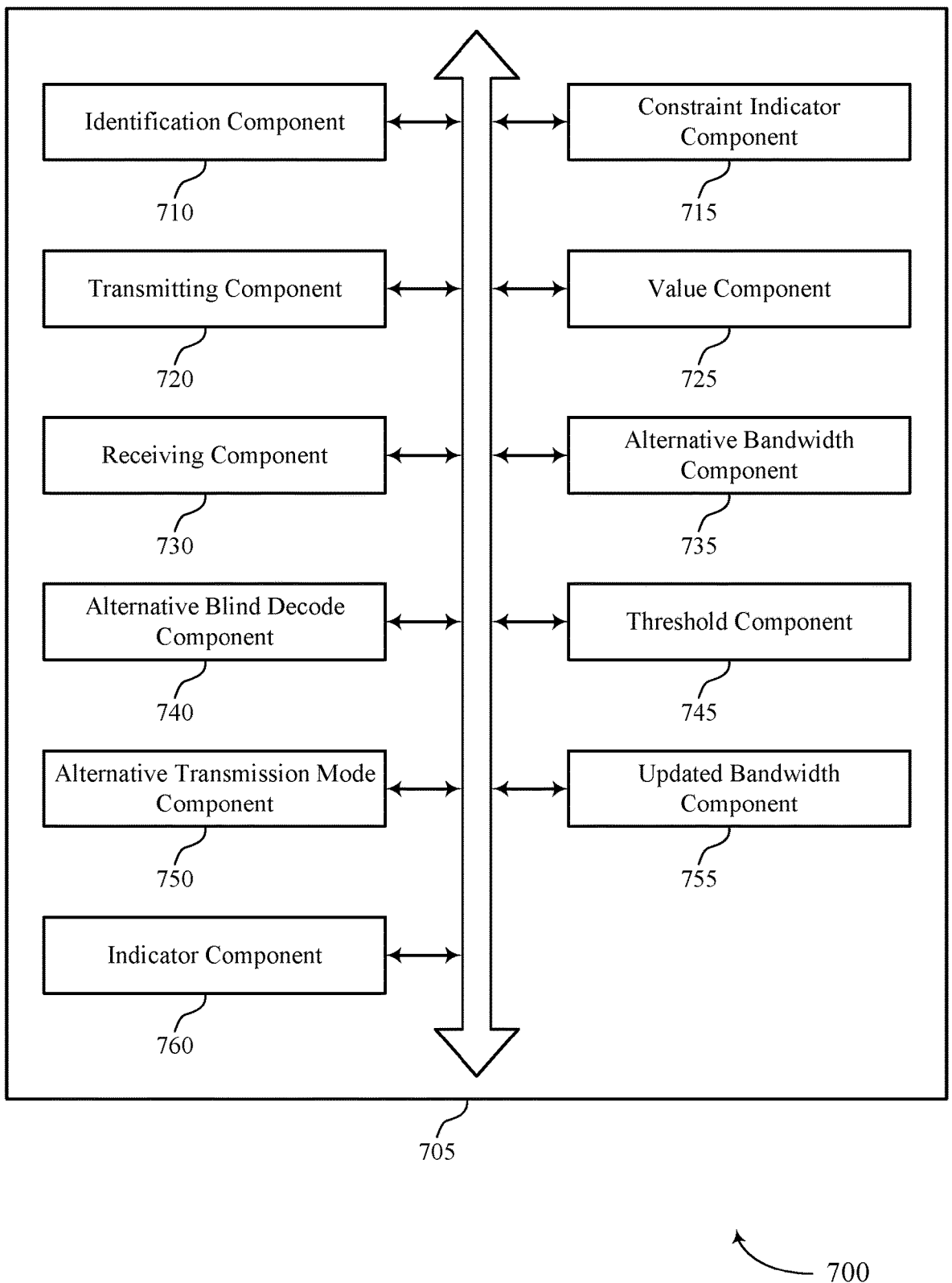
FIG. 7 shows a block diagram of a communications manager that supports indicating energy and thermal constraints in a wireless communications system in accordance with aspects of the present disclosure.

FIG. 7 shows a block diagram 700 of a communications manager 705 that supports indicating energy and thermal constraints in a wireless communications system in accordance with aspects of the present disclosure. The communications manager 705 may be an example of aspects of a communications manager 515, a communications manager 615, or a communications manager 810 described herein. The communications manager 705 may include an identification component 710, a constraint indicator component 715, a transmitting component 720, a value component 725, a receiving component 730, an alternative bandwidth component 735, an alternative blind decode component 740, a threshold component 745, an alternative transmission mode component 750, an updated bandwidth component 755, and an indicator component 760. Each of these modules may communicate, directly or indirectly, with one another (e.g., via one or more buses).

The identification component 710 may identify an indication of an amount of remaining energy for the UE or an indication of a temperature of the UE. In some examples, the identification component 710 may identify an indication of an amount of remaining energy for the UE or an indication of a temperature of the UE.

The constraint indicator component 715 may determine a constraint indicator based on the amount of remaining energy for the UE or the temperature of the UE. In some examples, the constraint indicator component 715 may select, from a set of discrete values, a discrete value for the constraint indicator. In some examples, the constraint indicator component 715 may determine a constraint indicator based on the amount of remaining energy for the UE or the temperature of the UE.

The transmitting component 720 may transmit, to a base station via physical layer signaling, the constraint indicator. In some examples, the transmitting component 720 may transmit, to a base station via physical layer signaling, an indicator of the alternative transmission mode. In some examples, the transmitting component 720 may transmit the constraint indicator via a physical layer transmission including a CQI, RI, PMI, or any combination thereof.

In some examples, the transmitting component 720 may transmit, to the base station via physical layer signaling, the first value for the CQI, RI, or PMI and the second value for the CQI, RI, or PMI.

In some examples, the transmitting component 720 may transmit, to the base station via physical layer signaling, an indicator of the alternative bandwidth. In some examples, the transmitting component 720 may transmit, to the base station via physical layer signaling, an indicator of the alternative number of blind decodes to support. In some examples, the transmitting component 720 may transmit the indicator of the alternative transmission mode via a physical layer transmission including a CQI, RI, PMI, or any combination thereof.

In some examples, the transmitting component 720 may transmit, to the base station via physical layer signaling, the constraint indicator. In some cases, the physical layer signaling includes a physical uplink control channel (PUCCH) transmission.

The alternative transmission mode component 750 may determine an alternative transmission mode, the alternative transmission mode including an alternative bandwidth or an alternative number of blind decodes to support, the alternative transmission mode based on the amount of remaining energy for the UE or the temperature of the UE. In some cases, the alternative bandwidth includes an alternative number of CCs or BWPs.

The value component 725 may determine a first value for a CQI, RI, or PMI. In some examples, the value component 725 may determine a second value for the CQI, RI, or PMI, the second value based on the amount of remaining energy for the UE or the temperature of the UE.

The receiving component 730 may receive, from the base station via physical layer signaling, an indicator of an updated value for the CQI, RI, or PMI, the updated value for the CQI, RI, or PMI based on the second value for the CQI, RI, or PMI. In some examples, the receiving component 730 may receive, from the base station via physical layer signaling, an indicator of an updated MCS, the updated MCS based on the constraint indicator.

In some examples, the receiving component 730 may receive, from the base station via physical layer signaling, an indicator of an updated RI, the updated RI based on the constraint indicator. In some examples, the receiving component 730 may receive, from the base station via physical layer signaling, an indicator of an updated bandwidth, the updated bandwidth based on the constraint indicator.

In some examples, the receiving component 730 may receive, from the base station via physical layer signaling, an indicator of an updated number of blind decodes to support, the updated number of blind decodes to support based on the constraint indicator. In some examples, the receiving component 730 may receive, from the base station via physical layer signaling, an indicator of the threshold amount of remaining energy or the threshold temperature.

In some examples, the receiving component 730 may receive, from the base station via physical layer signaling, an indicator of an updated number of blind decodes to support, the updated number of blind decodes to support based on the indicator of the alternative transmission mode.

In some examples, the receiving component 730 may receive, from the base station via physical layer signaling, an indicator of an updated number of blind decodes to support, the updated number of blind decodes to support based on the constraint indicator.

In some examples, the receiving component 730 may receive, from the base station via physical layer signaling, an indicator of the threshold amount of remaining energy or the threshold temperature. In some cases, the updated MCS is based on an amount of pending data for the UE. In some cases, the updated RI is based on an amount of pending data for the UE.

In some cases, the updated bandwidth includes an updated number of CCs or BWPs. In some cases, the updated bandwidth includes discontinuation of a dual connectivity configuration. In some cases, the updated number of blind decodes to support is based on an amount of pending data for the UE.

The alternative bandwidth component 735 may determine an alternative bandwidth based on the amount of remaining energy for the UE or the temperature of the UE. In some cases, the alternative bandwidth includes an alternative number of CCs or BWPs.

The alternative blind decode component 740 may determine an alternative number of blind decodes to support based on the amount of remaining energy for the UE or the temperature of the UE. The threshold component 745 may determine that the amount of remaining energy for the UE is below a threshold amount of remaining energy or that the temperature of the UE above a threshold temperature.

In some examples, the threshold component 745 may determine to transmit the constraint indicator based on the amount of remaining energy for the UE being below the threshold amount of remaining energy or the temperature of the UE being above the threshold temperature.

In some examples, the threshold component 745 may determine that the amount of remaining energy for the UE is below a threshold amount of remaining energy or that the temperature of the UE above a threshold temperature. In some examples, the threshold component 745 may determine to transmit the indicator of the alternative transmission mode based on the amount of remaining energy for the UE being below the threshold amount of remaining energy or the temperature of the UE being above the threshold temperature.

The updated bandwidth component 755 may receive, from the base station via physical layer signaling, an indicator of an updated bandwidth, the updated bandwidth based on the indicator of the alternative transmission mode. In some cases, the updated bandwidth includes an updated number of CCs or BWPs.

In some cases, the updated bandwidth includes discontinuation of a dual connectivity configuration. In some cases, the updated bandwidth is based on an amount of pending data for the UE. The indicator component 760 may receive, from the base station via physical layer signaling, an indicator of an updated bandwidth, the updated bandwidth based on the constraint indicator.

Figure 8:
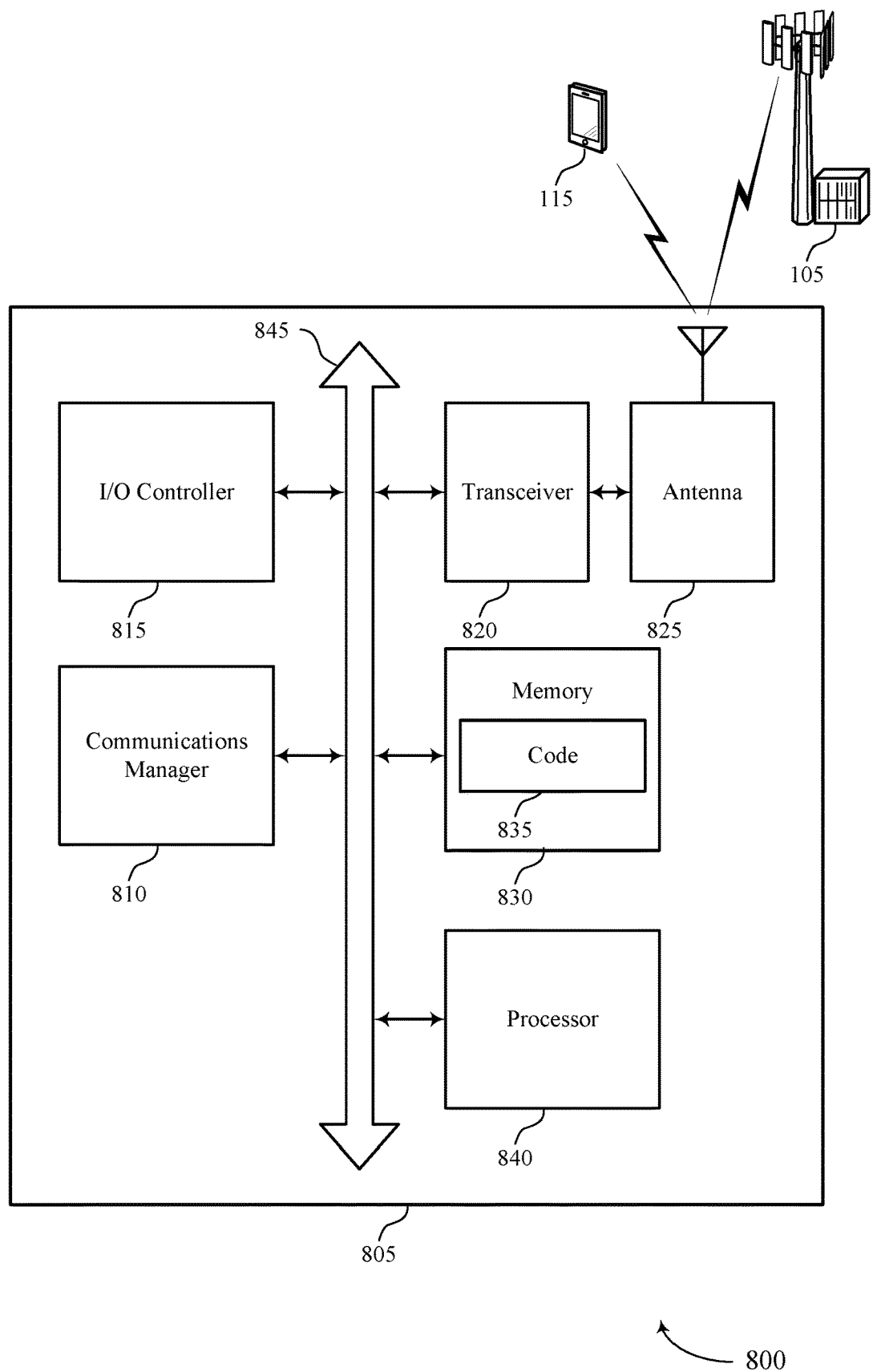
FIG. 8 shows a diagram of a system including a device that supports indicating energy and thermal constraints in a wireless communications system in accordance with aspects of the present disclosure.

FIG. 8 shows a diagram of a system 800 including a device 805 that supports indicating energy and thermal constraints in a wireless communications system in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify an indication of an amount of remaining energy for the UE or an indication of a temperature of the UE, determine a constraint indicator based on the amount of remaining energy for the UE or the temperature of the UE, and transmit, to a base station via physical layer signaling, the constraint indicator. The communications manager 810 may also identify an indication of an amount of remaining energy for the UE or an indication of a temperature of the UE, determine an alternative transmission mode, the alternative transmission mode including an alternative bandwidth or an alternative number of blind decodes to support, the alternative transmission mode based on the amount of remaining energy for the UE or the temperature of the UE, and transmit, to a base station via physical layer signaling, an indicator of the alternative transmission mode.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a Basic Input/Output System (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting indicating energy and thermal constraints in a wireless communications system).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
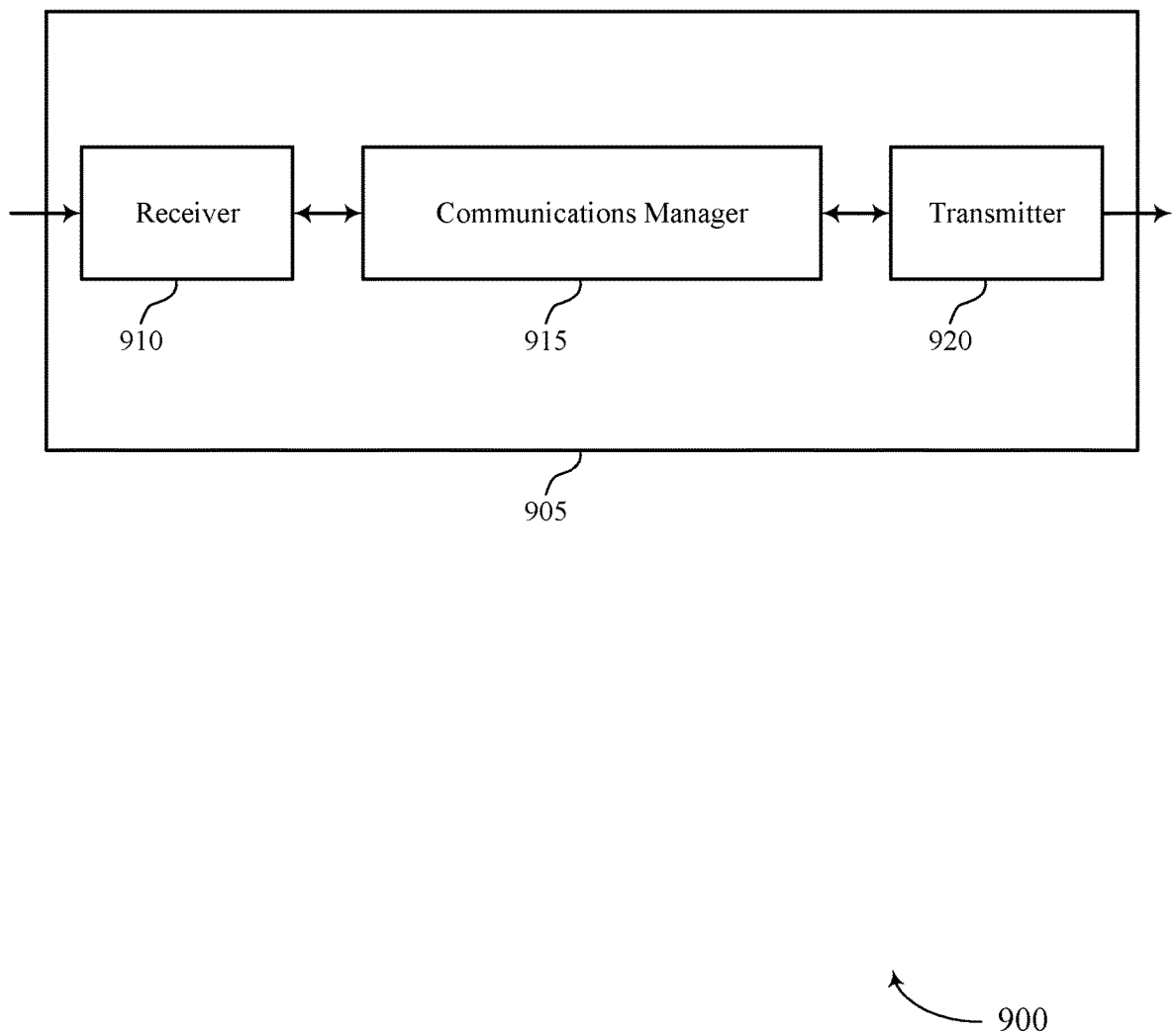
FIGS. 9 and 10 show block diagrams of devices that support indicating energy and thermal constraints in a wireless communications system in accordance with aspects of the present disclosure.

FIG. 9 shows a block diagram 900 of a device 905 that supports indicating energy and thermal constraints in a wireless communications system in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to indicating energy and thermal constraints in a wireless communications system, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE via physical layer signaling, a constraint indicator based on an amount of remaining energy for the UE or a temperature of the UE, determine, based on the constraint indicator, an updated transmission mode for the UE, and transmit, to the UE via physical layer signaling, an indicator of the updated transmission mode. The communications manager 915 may also receive, from a UE via physical layer signaling, an indicator of an alternative transmission mode for the UE, the alternative transmission mode including an alternative bandwidth or an alternative number of blind decodes to support based on an amount of remaining energy for the UE or a temperature of the UE, determine, based on the indicator of the alternative transmission mode, an updated transmission mode for the UE, the updated transmission mode including an updated bandwidth for the UE or an updated number of blind decodes for the UE to support, and transmit, to the UE via physical layer signaling, an indicator of the updated transmission mode. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
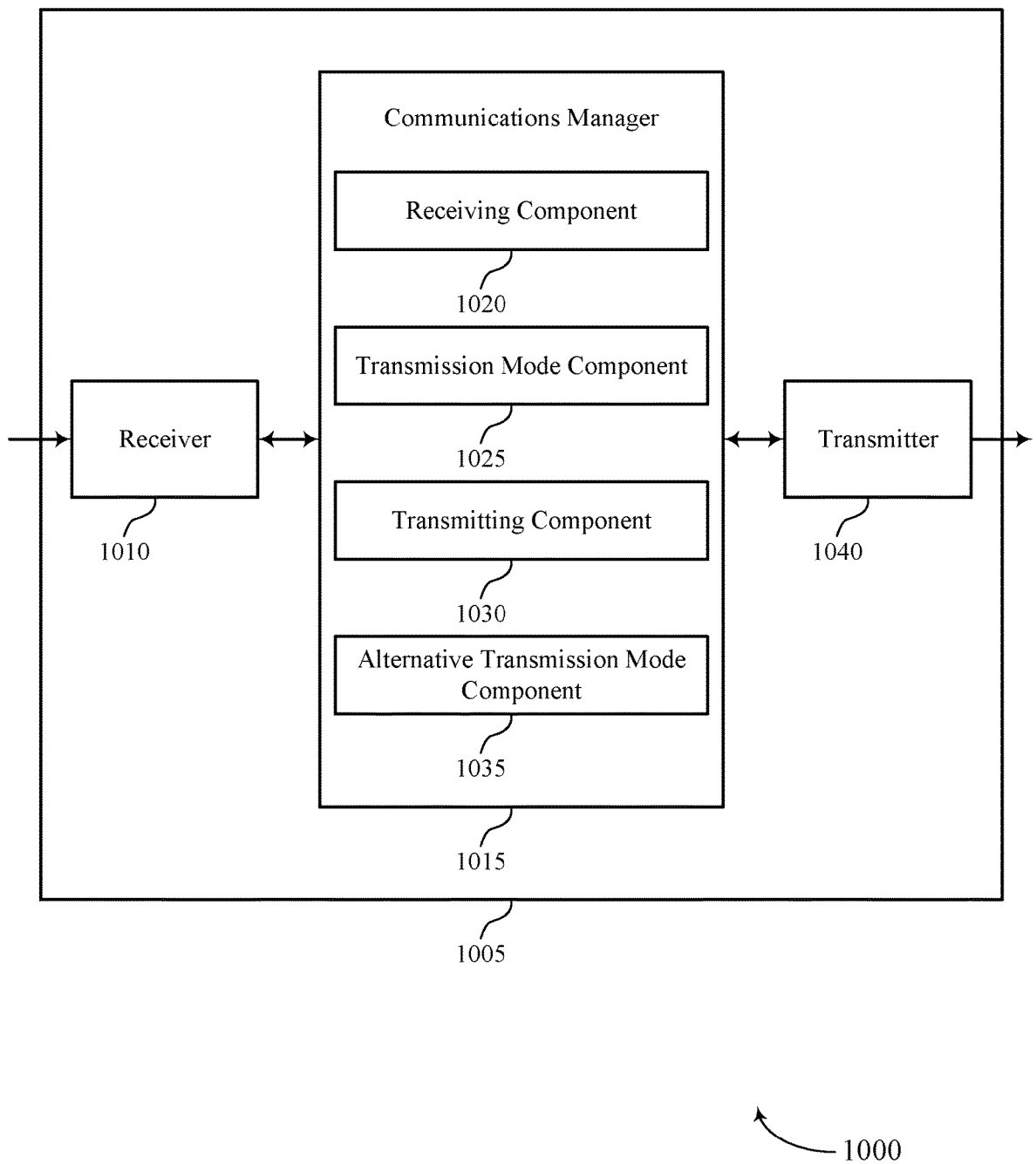

FIG. 10 shows a block diagram 1000 of a device 1005 that supports indicating energy and thermal constraints in a wireless communications system in accordance with aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to indicating energy and thermal constraints in a wireless communications system, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a receiving component 1020, a transmission mode component 1025, a transmitting component 1030, and an alternative transmission mode component 1035. The communications manager 1015 may be an example of aspects of the communications manager 1210 described herein.

The receiving component 1020 may receive, from a UE via physical layer signaling, a constraint indicator based on an amount of remaining energy for the UE or a temperature of the UE.

The transmission mode component 1025 may determine, based on the constraint indicator, an updated transmission mode for the UE.

The transmitting component 1030 may transmit, to the UE via physical layer signaling, an indicator of the updated transmission mode.

The receiving component 1020 may receive, from a UE via physical layer signaling, an indicator of an alternative transmission mode for the UE, the alternative transmission mode including an alternative bandwidth or an alternative number of blind decodes to support based on an amount of remaining energy for the UE or a temperature of the UE.

The alternative transmission mode component 1035 may determine, based on the indicator of the alternative transmission mode, an updated transmission mode for the UE, the updated transmission mode including an updated bandwidth for the UE or an updated number of blind decodes for the UE to support.

The transmitting component 1030 may transmit, to the UE via physical layer signaling, an indicator of the updated transmission mode.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
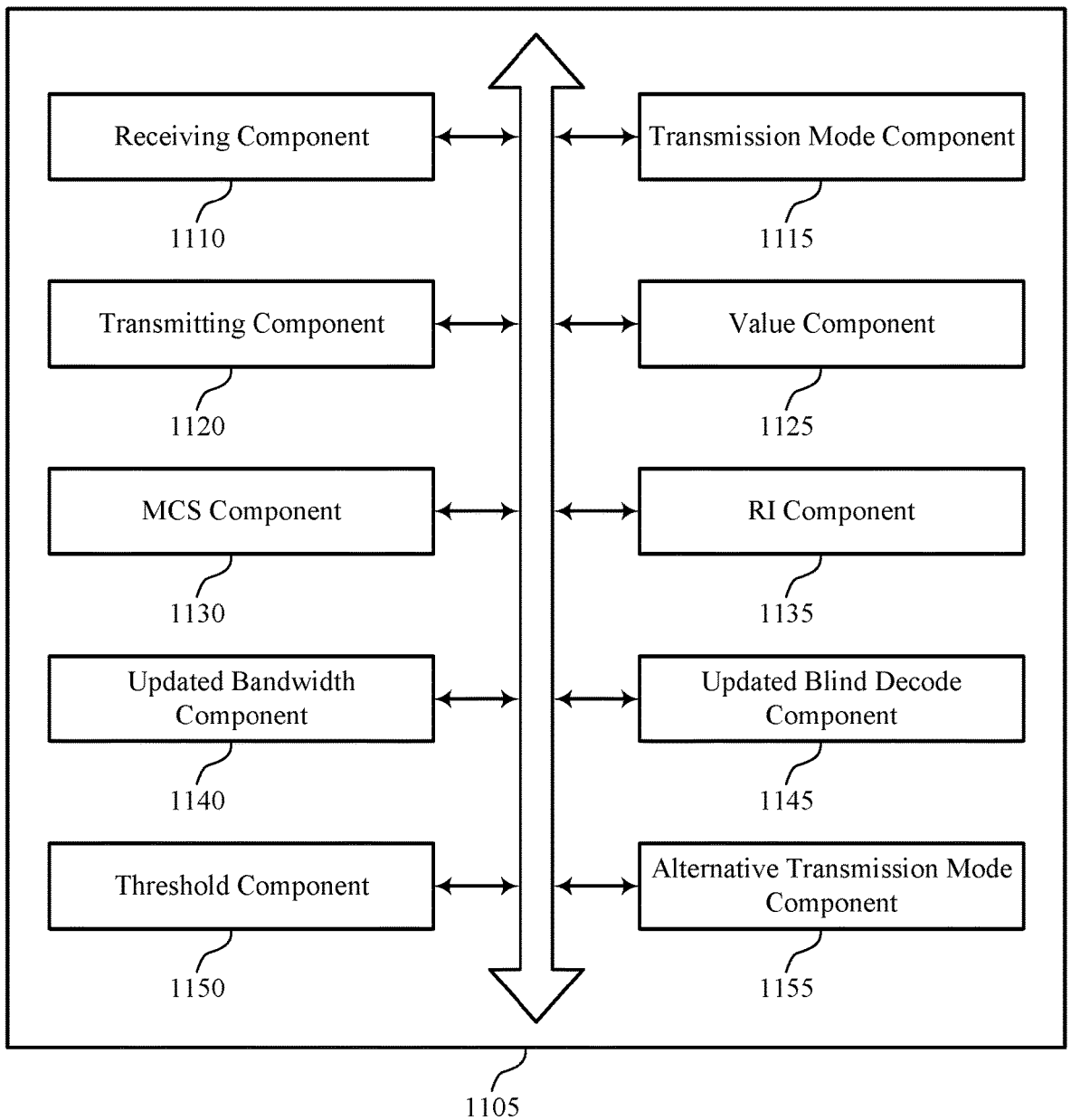
FIG. 11 shows a block diagram of a communications manager that supports indicating energy and thermal constraints in a wireless communications system in accordance with aspects of the present disclosure.

FIG. 11 shows a block diagram 1100 of a communications manager 1105 that supports indicating energy and thermal constraints in a wireless communications system in accordance with aspects of the present disclosure. The communications manager 1105 may be an example of aspects of a communications manager 915, a communications manager 1015, or a communications manager 1210 described herein. The communications manager 1105 may include a receiving component 1110, a transmission mode component 1115, a transmitting component 1120, a value component 1125, a MCS component 1130, a RI component 1135, an updated bandwidth component 1140, an updated blind decode component 1145, a threshold component 1150, and an alternative transmission mode component 1155. Each of these modules may communicate, directly or indirectly, with one another (e.g., via one or more buses).

The receiving component 1110 may receive, from a UE via physical layer signaling, a constraint indicator based on an amount of remaining energy for the UE or a temperature of the UE.

In some examples, the receiving component 1110 may receive, from a UE via physical layer signaling, an indicator of an alternative transmission mode for the UE, the alternative transmission mode including an alternative bandwidth or an alternative number of blind decodes to support based on an amount of remaining energy for the UE or a temperature of the UE.

In some examples, the receiving component 1110 may receive the constraint indicator via a physical layer transmission including a CQI, RI, PMI, or any combination thereof.

In some examples, the receiving component 1110 may receive, from the UE via physical layer signaling, an indicator of an alternative bandwidth, the alternative bandwidth based on the amount of remaining energy for the UE or the temperature of the UE.

In some examples, the receiving component 1110 may receive, from the UE via physical layer signaling, an indicator of an alternative number of blind decodes for the UE to support, the alternative number of blind decodes for the UE to support based on the amount of remaining energy for the UE or the temperature of the UE.

The transmission mode component 1115 may determine, based on the constraint indicator, an updated transmission mode for the UE. In some examples, the transmission mode component 1115 may determine, based on the constraint indicator, an updated number of blind decodes for the UE to support. In some cases, the constraint indicator includes a discrete value, the discrete value being one of a set of possible discrete values.

The transmitting component 1120 may transmit, to the UE via physical layer signaling, an indicator of the updated transmission mode. In some examples, the transmitting component 1120 may transmit, to the UE via physical layer signaling, an indicator of the updated transmission mode. In some examples, the transmitting component 1120 may transmit, to the UE via physical layer signaling, the indicator of the updated value for the CQI, RI, or PMI. In some cases, the physical layer signaling includes a physical uplink control channel (PUCCH) transmission.

The alternative transmission mode component 1155 may determine, based on the indicator of the alternative transmission mode, an updated transmission mode for the UE, the updated transmission mode including an updated bandwidth for the UE or an updated number of blind decodes for the UE to support.

In some examples, the alternative transmission mode component 1155 may receive the indicator of the alternative transmission mode via a physical layer transmission including a CQI, RI, PMI, or any combination thereof. The value component 1125 may receive, from the UE via physical layer signaling, a first value for a CQI, RI, or PMI.

In some examples, the value component 1125 may receive, from the UE via physical layer signaling, a second value for the CQI, RI, or PMI, the second value for the CQI, RI, or PMI based on the amount of remaining energy for the UE or the temperature of the UE.

In some examples, the value component 1125 may determine, based on the constraint indicator, an updated value for the CQI, RI, or PMI, the updated value for the CQI, RI, or PMI based on the second value for the CQI, RI, or PMI.

The MCS component 1130 may determine, based on the constraint indicator, an updated MCS for the UE. In some cases, the updated MCS for the UE is based on an amount of pending data for the UE. The RI component 1135 may determine, based on the constraint indicator, an updated RI for the UE. In some cases, the updated RI for the UE is based on an amount of pending data for the UE.

The updated bandwidth component 1140 may determine, based on the constraint indicator, an updated bandwidth for the UE. In some examples, the updated bandwidth component 1140 may determine, based on the indicator of the alternative bandwidth, the updated bandwidth for the UE. In some cases, the updated bandwidth for the UE is based on an amount of pending data for the UE. In some cases, the updated bandwidth includes an updated number of CCs or BWPs. In some cases, the updated bandwidth includes discontinuation of a dual connectivity configuration.

The updated blind decode component 1145 may determine, based on the indicator of the alternative number of blind decodes for the UE to support, an updated number of blind decodes for the UE to support. In some cases, the updated number of blind decodes for the UE to support is based on an amount of pending data for the UE. The threshold component 1150 may determine, for the UE, a threshold amount of remaining energy or a threshold temperature.

In some examples, the threshold component 1150 may configure the UE to transmit the constraint indicator based on the amount of remaining energy for the UE being below the threshold amount of remaining energy or the temperature of the UE being above the threshold temperature.

Figure 12:
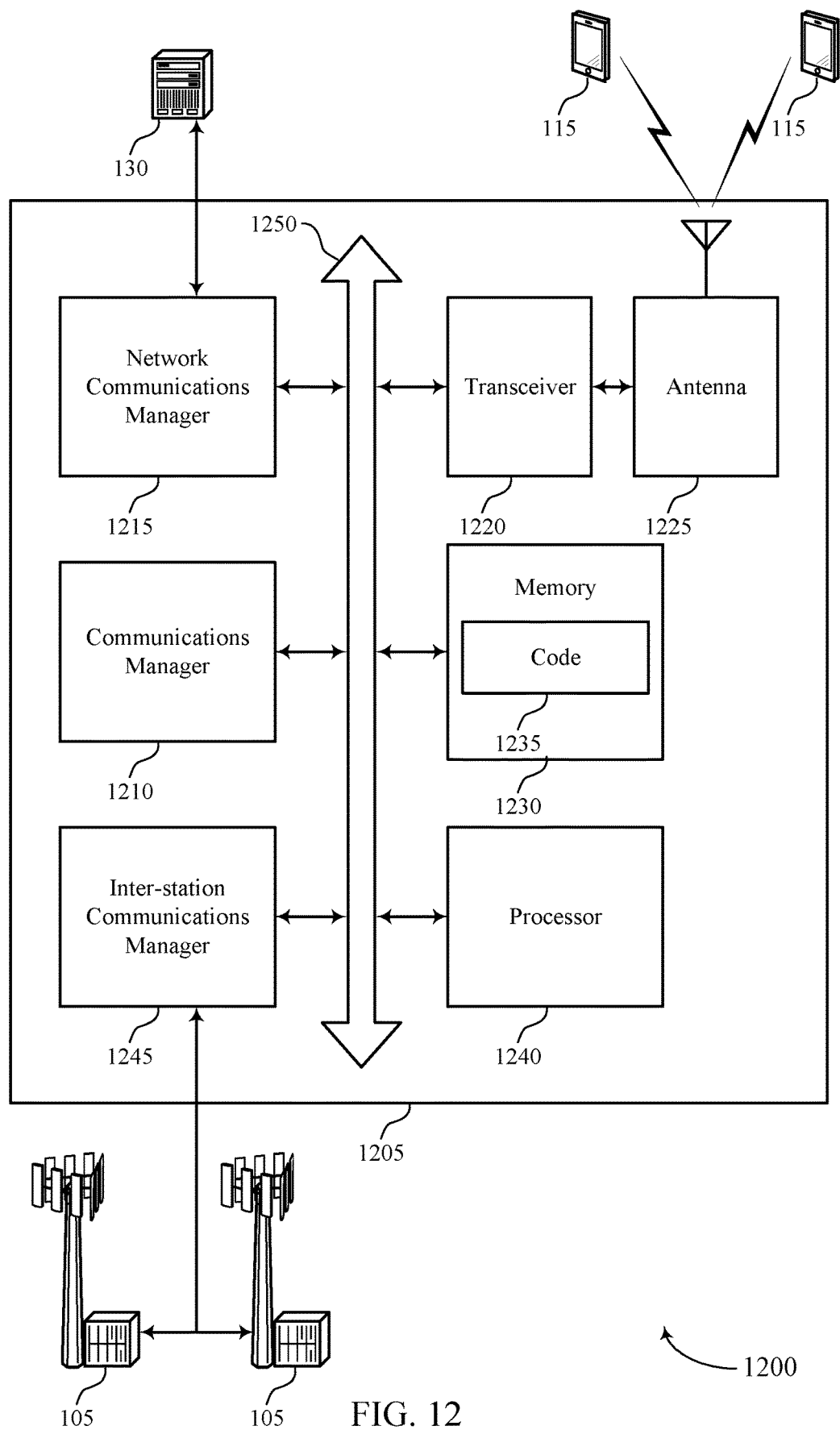
FIG. 12 shows a diagram of a system including a device that supports indicating energy and thermal constraints in a wireless communications system in accordance with aspects of the present disclosure.

FIG. 12 shows a diagram of a system 1200 including a device 1205 that supports indicating energy and thermal constraints in a wireless communications system in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE via physical layer signaling, a constraint indicator based on an amount of remaining energy for the UE or a temperature of the UE, determine, based on the constraint indicator, an updated transmission mode for the UE, and transmit, to the UE via physical layer signaling, an indicator of the updated transmission mode. The communications manager 1210 may also receive, from a UE via physical layer signaling, an indicator of an alternative transmission mode for the UE, the alternative transmission mode including an alternative bandwidth or an alternative number of blind decodes to support based on an amount of remaining energy for the UE or a temperature of the UE, determine, based on the indicator of the alternative transmission mode, an updated transmission mode for the UE, the updated transmission mode including an updated bandwidth for the UE or an updated number of blind decodes for the UE to support, and transmit, to the UE via physical layer signaling, an indicator of the updated transmission mode.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting indicating energy and thermal constraints in a wireless communications system).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
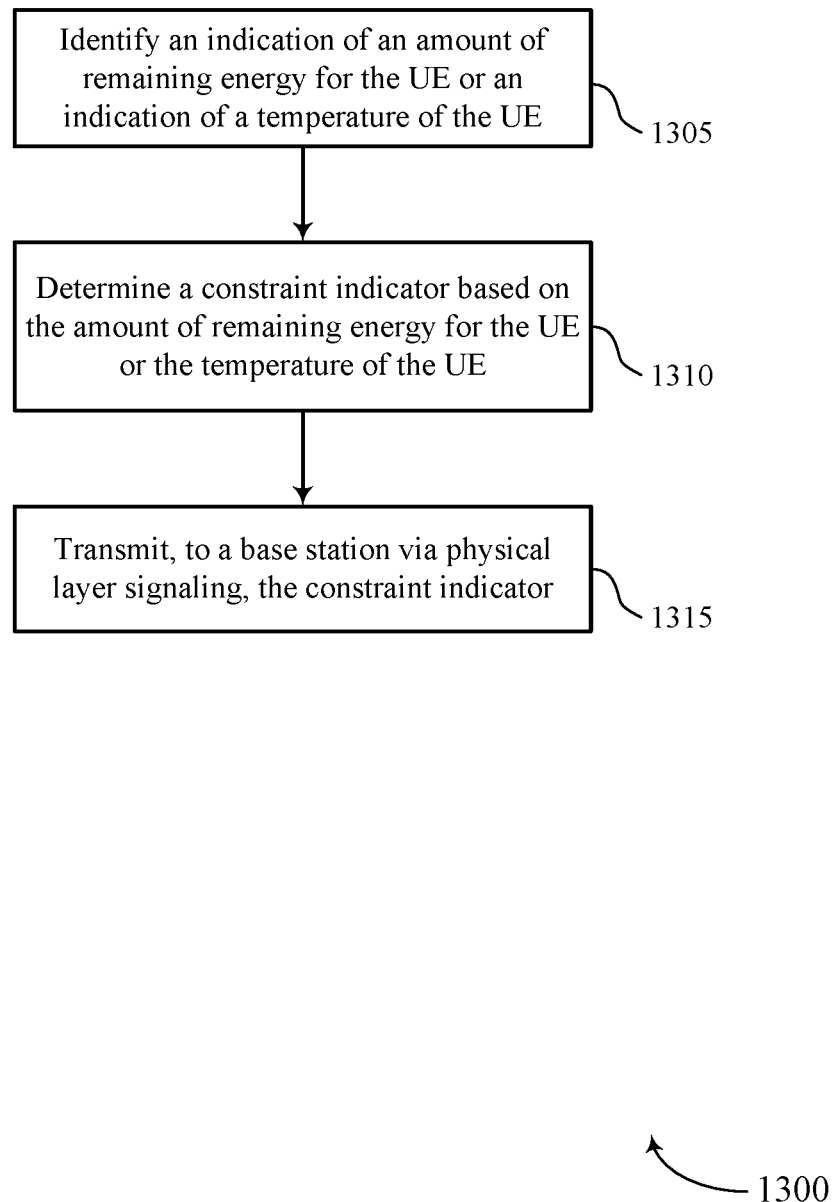
FIGS. 13 through 18 show flowcharts illustrating methods that support indicating energy and thermal constraints in a wireless communications system in accordance with aspects of the present disclosure.

FIG. 13 shows a flowchart illustrating a method 1300 that supports indicating energy and thermal constraints in a wireless communications system in accordance with aspects of the present disclosure. The operations of method 1300 may be implemented by a UE 115 or its components as described herein. For example, the operations of method 1300 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1305, the UE may identify an indication of an amount of remaining energy for the UE or an indication of a temperature of the UE. The operations of 1305 may be performed according to the methods described herein. In some examples, aspects of the operations of 1305 may be performed by an identification component as described with reference to FIGS. 5 to 8.

At 1310, the UE may determine a constraint indicator based on the amount of remaining energy for the UE or the temperature of the UE. The operations of 1310 may be performed according to the methods described herein. In some examples, aspects of the operations of 1310 may be performed by a constraint indicator component as described with reference to FIGS. 5 to 8.

At 1315, the UE may transmit, to a base station via physical layer signaling, the constraint indicator. The operations of 1315 may be performed according to the methods described herein. In some examples, aspects of the operations of 1315 may be performed by a transmitting component as described with reference to FIGS. 5 to 8.

Figure 14:
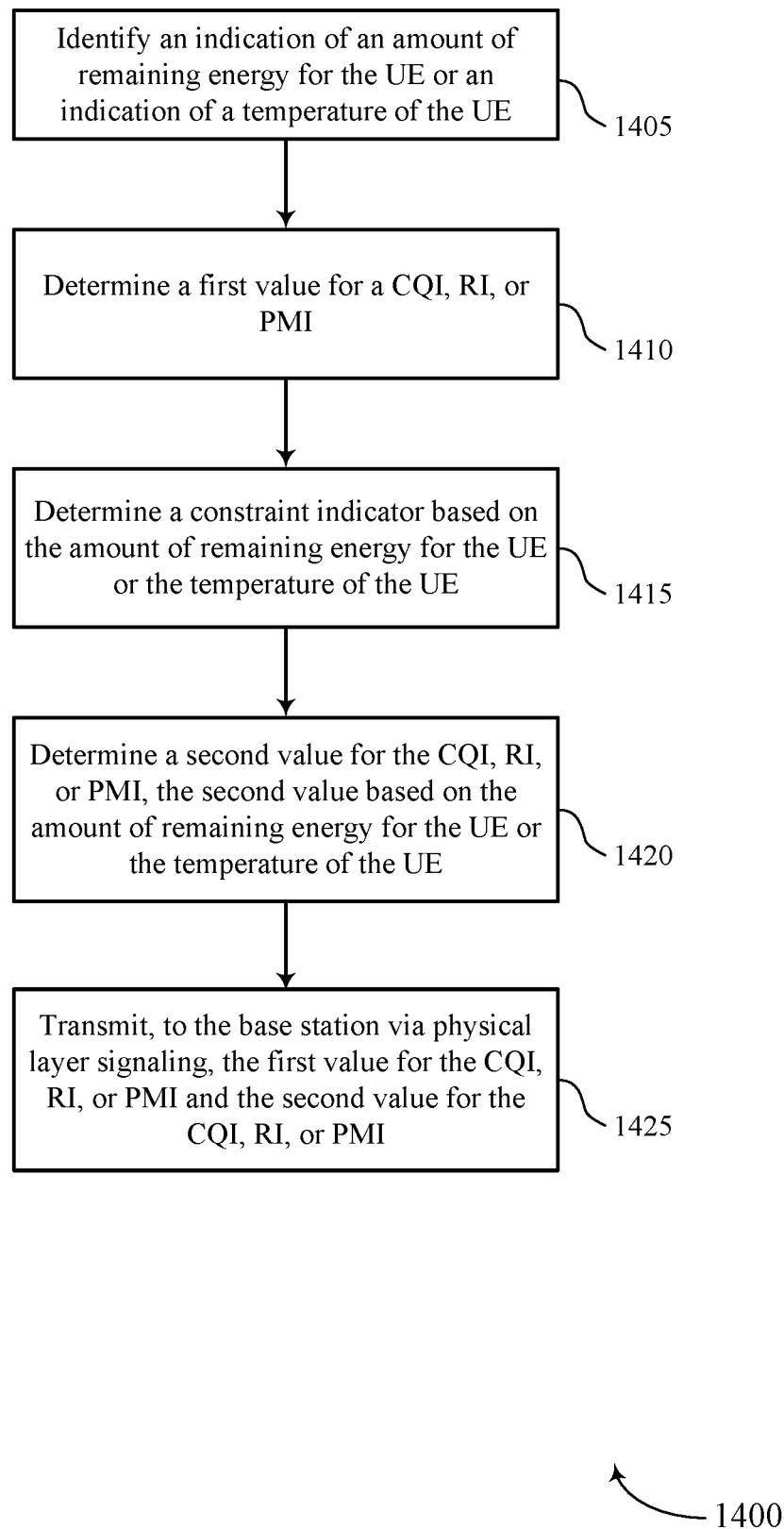

FIG. 14 shows a flowchart illustrating a method 1400 that supports indicating energy and thermal constraints in a wireless communications system in accordance with aspects of the present disclosure. The operations of method 1400 may be implemented by a UE 115 or its components as described herein. For example, the operations of method 1400 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1405, the UE may identify an indication of an amount of remaining energy for the UE or an indication of a temperature of the UE. The operations of 1405 may be performed according to the methods described herein. In some examples, aspects of the operations of 1405 may be performed by an identification component as described with reference to FIGS. 5 to 8.

At 1410, the UE may determine a first value for a CQI, RI, or PMI. The operations of 1410 may be performed according to the methods described herein. In some examples, aspects of the operations of 1410 may be performed by a value component as described with reference to FIGS. 5 to 8.

At 1415, the UE may determine a constraint indicator based on the amount of remaining energy for the UE or the temperature of the UE. The operations of 1415 may be performed according to the methods described herein. In some examples, aspects of the operations of 1415 may be performed by a constraint indicator component as described with reference to FIGS. 5 to 8.

At 1420, the UE may determine a second value for the CQI, RI, or PMI, the second value based on the amount of remaining energy for the UE or the temperature of the UE. The operations of 1420 may be performed according to the methods described herein. In some examples, aspects of the operations of 1420 may be performed by a value component as described with reference to FIGS. 5 to 8.

At 1425, the UE may transmit, to the base station via physical layer signaling, the first value for the CQI, RI, or PMI and the second value for the CQI, RI, or PMI. The operations of 1425 may be performed according to the methods described herein. In some examples, aspects of the operations of 1430 may be performed by a transmitting component as described with reference to FIGS. 5 to 8.

Figure 15:
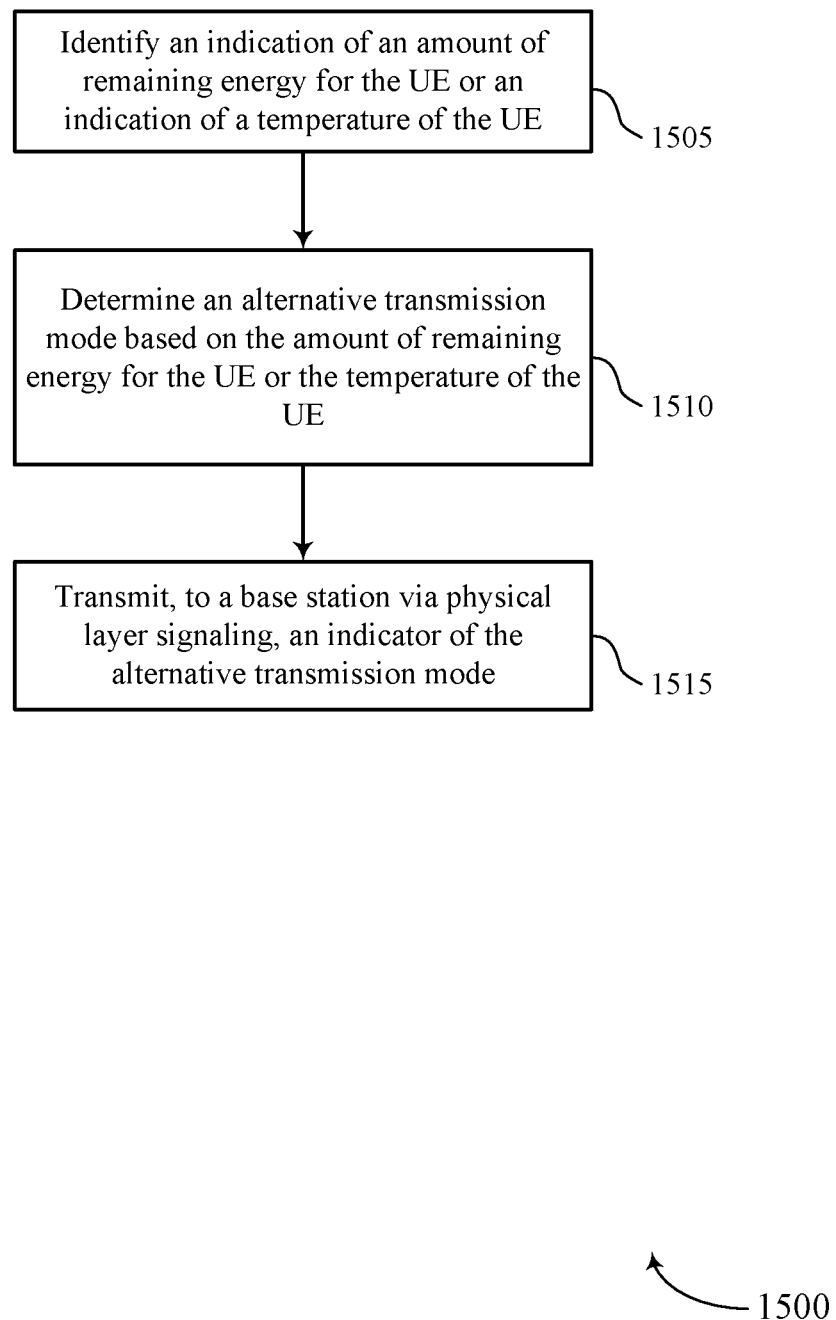

FIG. 15 shows a flowchart illustrating a method 1500 that supports indicating energy and thermal constraints in a wireless communications system in accordance with aspects of the present disclosure. The operations of method 1500 may be implemented by a UE 115 or its components as described herein. For example, the operations of method 1500 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1505, the UE may identify an indication of an amount of remaining energy for the UE or an indication of a temperature of the UE. The operations of 1505 may be performed according to the methods described herein. In some examples, aspects of the operations of 1505 may be performed by an identification component as described with reference to FIGS. 5 to 8.

At 1510, the UE may determine an alternative transmission mode based on the amount of remaining energy for the UE or the temperature of the UE. In some cases, the alternative transmission mode may include an alternative bandwidth or an alternative number of blind decodes to support. The operations of 1510 may be performed according to the methods described herein. In some examples, aspects of the operations of 1510 may be performed by an alternative transmission mode component as described with reference to FIGS. 5 to 8.

At 1515, the UE may transmit, to a base station via physical layer signaling, an indicator of the alternative transmission mode. The operations of 1515 may be performed according to the methods described herein. In some examples, aspects of the operations of 1515 may be performed by a transmitting component as described with reference to FIGS. 5 to 8.

Figure 16:
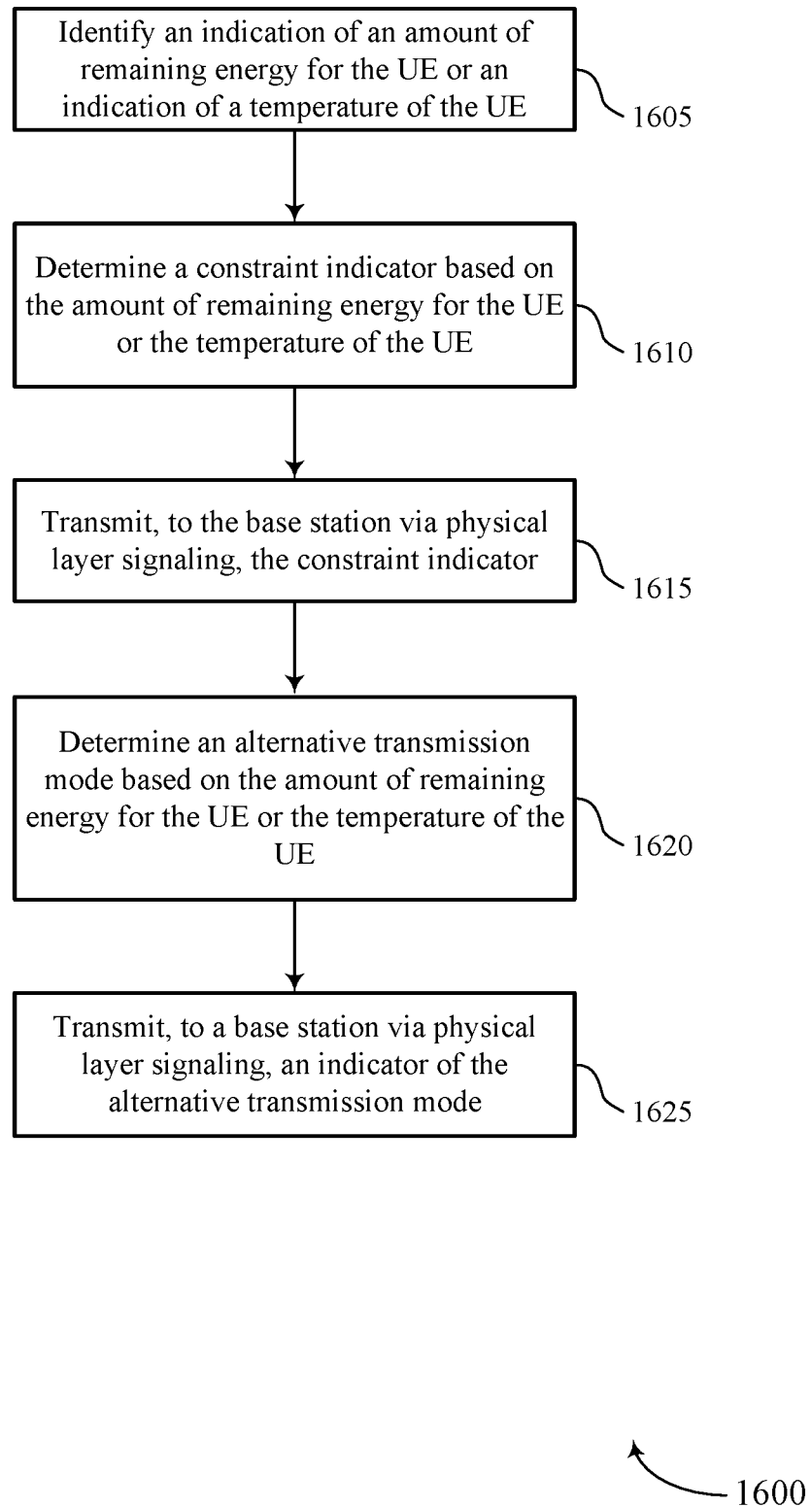

FIG. 16 shows a flowchart illustrating a method 1600 that supports indicating energy and thermal constraints in a wireless communications system in accordance with aspects of the present disclosure. The operations of method 1600 may be implemented by a UE 115 or its components as described herein. For example, the operations of method 1600 may be performed by a communications manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1605, the UE may identify an indication of an amount of remaining energy for the UE or an indication of a temperature of the UE. The operations of 1605 may be performed according to the methods described herein. In some examples, aspects of the operations of 1605 may be performed by an identification component as described with reference to FIGS. 5 to 8.

At 1610, the UE may determine a constraint indicator based on the amount of remaining energy for the UE or the temperature of the UE. The operations of 1610 may be performed according to the methods described herein. In some examples, aspects of the operations of 1610 may be performed by a constraint indicator component as described with reference to FIGS. 5 to 8.

At 1615, the UE may transmit, to the base station via physical layer signaling, the constraint indicator. The operations of 1615 may be performed according to the methods described herein. In some examples, aspects of the operations of 1615 may be performed by a transmitting component as described with reference to FIGS. 5 to 8.

At 1620, the UE may determine an alternative transmission mode based on the amount of remaining energy for the UE or the temperature of the UE. In some cases, the alternative transmission mode may include an alternative bandwidth or an alternative number of blind decodes to support. The operations of 1620 may be performed according to the methods described herein. In some examples, aspects of the operations of 1620 may be performed by an alternative transmission mode component as described with reference to FIGS. 5 to 8.

At 1625, the UE may transmit, to a base station via physical layer signaling, an indicator of the alternative transmission mode. The operations of 1625 may be performed according to the methods described herein. In some examples, aspects of the operations of 1625 may be performed by a transmitting component as described with reference to FIGS. 5 to 8.

Figure 17:
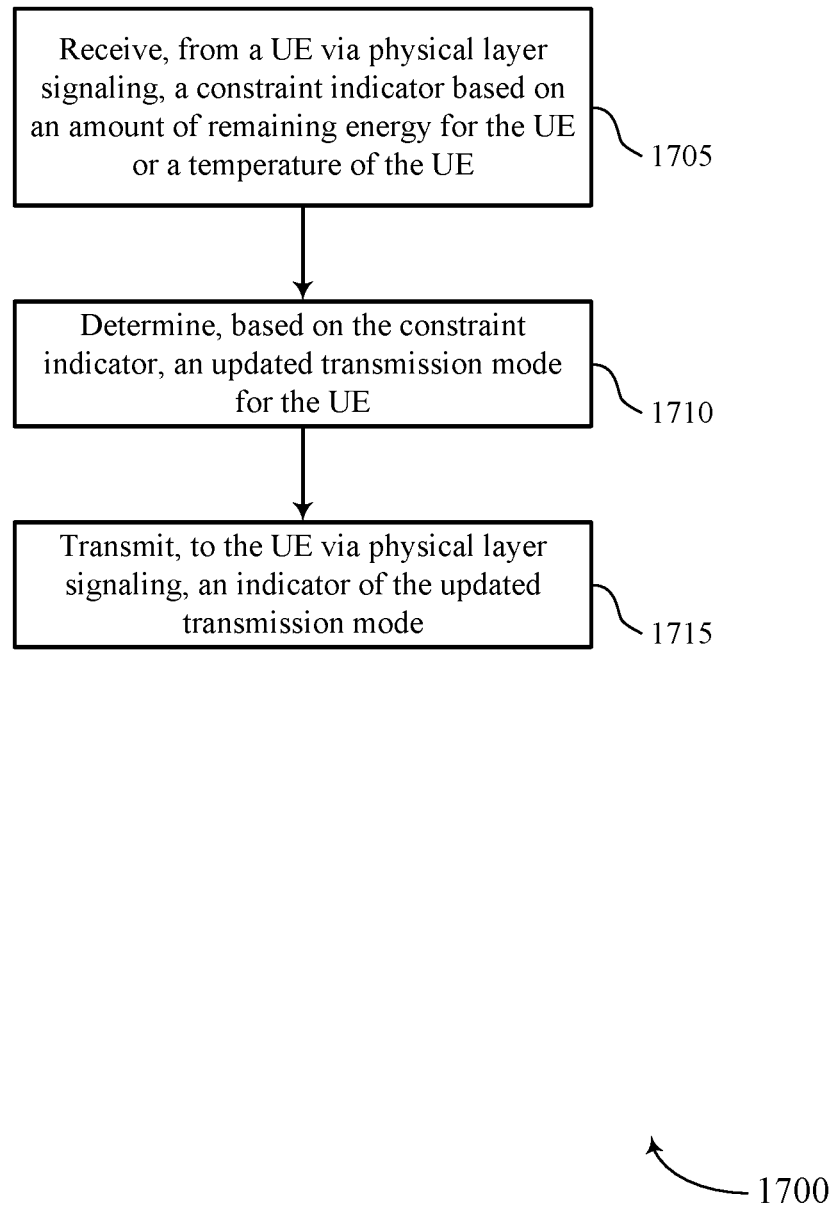

FIG. 17 shows a flowchart illustrating a method 1700 that supports indicating energy and thermal constraints in a wireless communications system in accordance with aspects of the present disclosure. The operations of method 1700 may be implemented by a base station 105 or its components as described herein. For example, the operations of method 1700 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE via physical layer signaling, a constraint indicator based on an amount of remaining energy for the UE or a temperature of the UE. The operations of 1705 may be performed according to the methods described herein. In some examples, aspects of the operations of 1705 may be performed by a receiving component as described with reference to FIGS. 9 to 12.

At 1710, the base station may determine, based on the constraint indicator, an updated transmission mode for the UE. The operations of 1710 may be performed according to the methods described herein. In some examples, aspects of the operations of 1710 may be performed by a transmission mode component as described with reference to FIGS. 9 to 12.

At 1715, the base station may transmit, to the UE via physical layer signaling, an indicator of the updated transmission mode. The operations of 1715 may be performed according to the methods described herein. In some examples, aspects of the operations of 1715 may be performed by a transmitting component as described with reference to FIGS. 9 to 12.

Figure 18:
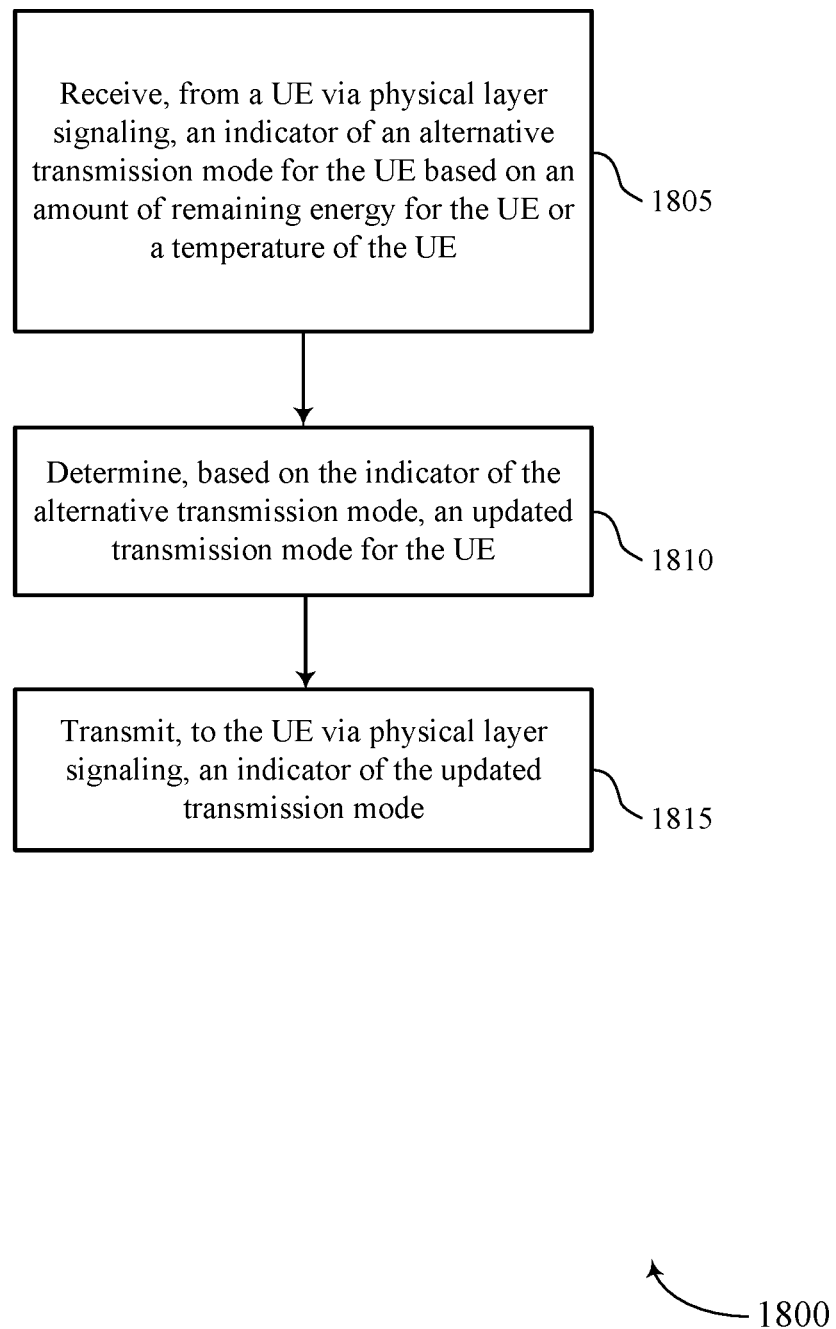

FIG. 18 shows a flowchart illustrating a method 1800 that supports indicating energy and thermal constraints in a wireless communications system in accordance with aspects of the present disclosure. The operations of method 1800 may be implemented by a base station 105 or its components as described herein. For example, the operations of method 1800 may be performed by a communications manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE via physical layer signaling, an indicator of an alternative transmission mode for the UE based on an amount of remaining energy for the UE or a temperature of the UE. In some cases, the alternative transmission mode may include an alternative bandwidth or an alternative number of blind decodes to support. The operations of 1805 may be performed according to the methods described herein. In some examples, aspects of the operations of 1805 may be performed by a receiving component as described with reference to FIGS. 9 to 12.

At 1810, the base station may determine, based on the indicator of the alternative transmission mode, an updated transmission mode for the UE. In some cases, the updated transmission mode may include an updated bandwidth for the UE or an updated number of blind decodes for the UE to support. The operations of 1810 may be performed according to the methods described herein. In some examples, aspects of the operations of 1810 may be performed by an alternative transmission mode component as described with reference to FIGS. 9 to 12.

At 1815, the base station may transmit, to the UE via physical layer signaling, an indicator of the updated transmission mode. The operations of 1815 may be performed according to the methods described herein. In some examples, aspects of the operations of 1815 may be performed by a transmitting component as described with reference to FIGS. 9 to 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying, at a user equipment (UE), an indication of an amount of remaining energy for the UE or an indication of a temperature of the UE;
   determining, by the UE, a constraint indicator based at least in part on the amount of remaining energy for the UE or the temperature of the UE;
   transmitting, to a base station via physical layer signaling, the constraint indicator; and
   receiving, from the base station, an indicator of an updated bandwidth for the UE to transmit signals to the base station or an indicator of an updated modulation and coding scheme (MCS) for communications between the UE and the base station, or both, wherein at least one of the updated bandwidth or the updated MCS is based at least in part on the constraint indicator.

2. The method of claim 1, wherein transmitting the constraint indicator comprises:
   transmitting the constraint indicator via a physical layer transmission comprising a channel quality indicator (CQI), rank index (RI), precoding matrix indicator (PMI), or any combination thereof.

3. The method of claim 1, further comprising:
   determining a first value for a channel quality indicator (CQI), rank index (RI), or precoding matrix indicator (PMI);
   determining a second value for the CQI, RI, or PMI, the second value based at least in part on the amount of remaining energy for the UE or the temperature of the UE;
   transmitting, to the base station via physical layer signaling, the first value for the CQI, RI, or PMI and the second value for the CQI, RI, or PMI; and
   receiving, from the base station via physical layer signaling, an indicator of an updated value for the CQI, RI, or PMI that is based at least in part on the second value for the CQI, RI, or PMI.

4. The method of claim 1,
wherein the indicator of the updated MCS is received from the base station via physical layer signaling, and wherein the indicator of the updated MCS is based at least in part on an amount of pending data for the UE.

5. The method of claim 1, further comprising:
receiving, from the base station via physical layer signaling, an indicator of an updated rank index (RI) that is based at least in part on the constraint indicator, an amount of pending data for the UE, or any combination thereof.

6. The method of claim 1, wherein the updated bandwidth comprises an updated number of component carriers (CCs) or bandwidth parts (BWPs).

7. The method of claim 1, wherein the updated bandwidth comprises discontinuation of a dual connectivity configuration.

8. The method of claim 1, further comprising:
determining, by the UE, an alternative bandwidth based at least in part on the amount of remaining energy for the UE or the temperature of the UE, wherein the alternative bandwidth comprises an alternative number of component carriers (CCs) or bandwidth parts (BWPs); and
transmitting, to the base station via physical layer signaling, an indicator of the alternative bandwidth.

9. The method of claim 1, further comprising:
receiving, from the base station via physical layer signaling, an indicator of an updated number of blind decodes to support that is based at least in part on the constraint indicator.

10. The method of claim 1, further comprising:
determining, by the UE, an alternative number of blind decodes to support based at least in part on the amount of remaining energy for the UE or the temperature of the UE; and
transmitting, to the base station via physical layer signaling, an indicator of the alternative number of blind decodes to support.

11. The method of claim 1, wherein determining the constraint indicator comprises:
selecting, from a set of discrete values, a discrete value for the constraint indicator.

12. The method of claim 1, further comprising:
determining that the amount of remaining energy for the UE is below a threshold amount of remaining energy or that the temperature of the UE above a threshold temperature; and
determining to transmit the constraint indicator based at least in part on the amount of remaining energy for the UE being below the threshold amount of remaining energy or the temperature of the UE being above the threshold temperature.

13. The method of claim 12, further comprising:
receiving, from the base station via physical layer signaling, an indicator of the threshold amount of remaining energy or the threshold temperature.

14. The method of claim 1, wherein:
the identifying comprises identifying the indication of the temperature of the UE; and
the constraint indicator is determined based at least in part on the temperature of the UE.

15. A method for wireless communications, comprising:
identifying, at a user equipment (UE), an indication of an amount of remaining energy for the UE or an indication of a temperature of the UE;
determining, by the UE, an alternative transmission mode, the alternative transmission mode comprising an alternative bandwidth for the UE to transmit signals or an alternative number of blind decodes to support, the alternative transmission mode based at least in part on the amount of remaining energy for the UE or the temperature of the UE; and
transmitting, to a base station via physical layer signaling, an indicator of the alternative transmission mode.

16. The method of claim 15, wherein transmitting the indicator of the alternative transmission mode comprises:
transmitting the indicator of the alternative transmission mode via a physical layer transmission comprising a channel quality indicator (CQI), rank index (RI), precoding matrix indicator (PMI), or any combination thereof.

17. The method of claim 15, further comprising:
receiving, from the base station via physical layer signaling, an indicator of an updated bandwidth for the UE to transmit signals that is based at least in part on the indicator of the alternative transmission mode, an amount of pending data for the UE, or any combination thereof.

18. The method of claim 17, wherein the updated bandwidth comprises an updated number of component carriers (CCs), an updated number of bandwidth parts (BWPs), or a discontinuation of a dual connectivity configuration.

19. The method of claim 15, further comprising:
receiving, from the base station via physical layer signaling, an indicator of an updated number of blind decodes to support that is based at least in part on the indicator of the alternative transmission mode, an amount of pending data for the UE, or any combination thereof.

20. The method of claim 15, further comprising:
determining, by the UE, a constraint indicator based at least in part on the amount of remaining energy for the UE or the temperature of the UE;
transmitting, to the base station via physical layer signaling, the constraint indicator; and
receiving, from the base station via physical layer signaling, an indicator of an updated bandwidth for the UE to transmit signals or a number of blind decodes to support that is based at least in part on the constraint indicator.

21. The method of claim 15, further comprising:
receiving, from the base station via physical layer signaling, an indicator of a threshold amount of remaining energy or a threshold temperature;
determining that the amount of remaining energy for the UE is below the threshold amount of remaining energy or that the temperature of the UE above the threshold temperature; and
determining to transmit the indicator of the alternative transmission mode based at least in part on the amount of remaining energy for the UE being below the threshold amount of remaining energy or the temperature of the UE being above the threshold temperature.

22. A method for wireless communications, comprising:
receiving, from a user equipment (UE) via physical layer signaling, a constraint indicator based at least in part on an amount of remaining energy for the UE or a temperature of the UE;
determining, based at least in part on the constraint indicator, an updated transmission mode for the UE, wherein the updated transmission mode comprises an updated bandwidth for the UE to transmit signals to the base station or an updated modulation and coding scheme (MCS) for communications between the UE and the base station, or both, and wherein at least one of the updated bandwidth or the updated MCS is based at least in part on the constraint indicator; and transmitting, to the UE via physical layer signaling, an indicator of the updated transmission mode and one or more of an indicator of the updated bandwidth or an indicator of the updated MCS.

23. The method of claim 22, further comprising:
receiving the constraint indicator via a physical layer transmission comprising a channel quality indicator (CQI), rank index (RI), precoding matrix indicator (PMI), or any combination thereof.

24. The method of claim 22, further comprising:
receiving, from the UE via physical layer signaling, a first value for a channel quality indicator (CQI), rank index (RI), or precoding matrix indicator (PMI);
receiving, from the UE via physical layer signaling, a second value for the CQI, RI, or PMI, the second value for the CQI, RI, or PMI based at least in part on the amount of remaining energy for the UE or the temperature of the UE;
determining, based at least in part on the constraint indicator, an updated value for the CQI, RI, or PMI, the updated value for the CQI, RI, or PMI based at least in part on the second value for the CQI, RI, or PMI; and
transmitting, to the UE via physical layer signaling, the indicator of the updated value for the CQI, RI, or PMI.

25. The method of claim 22, wherein determining the updated transmission mode comprises:
determining, based at least in part on the constraint indicator, an updated rank index (RI) for the UE that is based at least in part on an amount of pending data for the UE.

26. The method of claim 22, wherein determining the updated transmission mode further comprises:
receiving, from the UE via physical layer signaling, an indicator of an alternative bandwidth that is based at least in part on the amount of remaining energy for the UE or the temperature of the UE; and
determining, based at least in part on the indicator of the alternative bandwidth, the updated bandwidth for the UE.

27. The method of claim 22, wherein determining the updated transmission mode further comprises:
receiving, from the UE via physical layer signaling, an indicator of an alternative number of blind decodes for the UE to support that is based at least in part on the amount of remaining energy for the UE, the temperature of the UE, an amount of pending data for the UE, or any combination thereof; and
determining, based at least in part on the indicator of the alternative number of blind decodes for the UE to support, an updated number of blind decodes for the UE to support.

28. The method of claim 22, wherein determining the updated transmission mode further comprises:
determining, for the UE, a threshold amount of remaining energy or a threshold temperature; and
configuring the UE to transmit the constraint indicator based at least in part on the amount of remaining energy for the UE being below the threshold amount of remaining energy or the temperature of the UE being above the threshold temperature.

29. A method for wireless communications, comprising:
receiving, from a user equipment (UE) via physical layer signaling, an indicator of an alternative transmission mode for the UE, the alternative transmission mode based at least in part on an amount of remaining energy for the UE or a temperature of the UE and comprising an alternative bandwidth for the UE to transmit signals or an alternative number of blind decodes to support;
determining, based at least in part on the indicator of the alternative transmission mode, an updated transmission mode for the UE, the updated transmission mode comprising an updated bandwidth for the UE to transmit signals or an updated number of blind decodes for the UE to support; and
transmitting, to the UE via physical layer signaling, an indicator of the updated transmission mode.

30. The method of claim 29, wherein receiving the indicator of the alternative transmission mode comprises:
receiving the indicator of the alternative transmission mode via a physical layer transmission comprising a channel quality indicator (CQI), rank index (RI), precoding matrix indicator (PMI), or any combination thereof.

* * * * *